(12) United States Patent
Kikin-Gil et al.

(10) Patent No.: US 8,682,973 B2
(45) Date of Patent: Mar. 25, 2014

(54) MULTI-USER AND MULTI-DEVICE COLLABORATION

(75) Inventors: Erez Kikin-Gil, Redmond, WA (US);
Joseph F. Friend, Bothell, WA (US);
Ned B. Friend, Seattle, WA (US);
Matthew J. Kotler, Sammamish, WA (US); Charles W. Parker, Sammamish, WA (US); Igor Zaika, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 188 days.

(21) Appl. No.: 13/253,839

(22) Filed: Oct. 5, 2011

(65) Prior Publication Data

US 2013/0091205 A1   Apr. 11, 2013

(51) Int. Cl.
*G06F 15/16*   (2006.01)
(52) U.S. Cl.
USPC ........................... 709/204; 709/220; 709/221
(58) Field of Classification Search
USPC .......................................... 709/204, 802, 205
See application file for complete search history.

(56) References Cited

U.S. PATENT DOCUMENTS

| | | | |
|---|---|---|---|
| 4,831,552 A | 5/1989 | Scully et al. |
| 5,495,269 A | 2/1996 | Elrod et al. |
| 5,675,752 A | 10/1997 | Scott et al. |
| 5,717,869 A | 2/1998 | Moran et al. |
| 5,821,925 A | 10/1998 | Carey et al. |
| 5,907,324 A | 5/1999 | Larson et al. |
| 6,016,478 A | 1/2000 | Zhang et al. |
| 6,018,346 A | 1/2000 | Moran |
| 6,119,147 A | 9/2000 | Toomey |
| 6,192,395 B1 | 2/2001 | Lerner et al. |
| 6,353,436 B1 | 3/2002 | Reichlen |
| 6,564,246 B1 | 5/2003 | Varma |
| 6,586,349 B1 | 7/2003 | Jeon |
| 6,633,315 B1 | 10/2003 | Sobeski et al. |
| 6,639,836 B1 | 10/2003 | Hung |
| 6,670,970 B1 | 12/2003 | Bonura et al. |
| 6,735,615 B1 | 5/2004 | Iwayama et al. |
| 6,738,075 B1 | 5/2004 | Torres et al. |

(Continued)

FOREIGN PATENT DOCUMENTS

| | | |
|---|---|---|
| EP | 1 517 260 | 3/2005 |
| JP | 04-257046 | 9/1992 |

(Continued)

OTHER PUBLICATIONS

"Aquatic Sugar: The Children's Interface, Translated for Adults," One Laptop Per Child News, Nov. 7, 2007, 5 pages.

(Continued)

*Primary Examiner* — Tammy Nguyen
(74) *Attorney, Agent, or Firm* — Merchant & Gould

(57) ABSTRACT

Multi-user, multi-computing device collaborative work experience is provided. One or more computing devices, including wired and wireless personal computers, laptop computers, servers, handheld mobile computing devices, for example, mobile telephones, tablet type computers, slate type computers and the like, may be linked together to allow users of such devices to engage in a collaborative work session. Information for each user engaged in the collaborative work session may be displayed on the one or more devices along with any content such as agenda items, documents, data, images, and the like. User participation may be tracked, and information on user participation, work session communications and content may be stored for subsequent use.

20 Claims, 11 Drawing Sheets

(56) References Cited

U.S. PATENT DOCUMENTS

| | | | |
|---|---|---|---|
| 6,926,799 B2 | 8/2005 | Yeom | |
| 6,933,495 B1 | 8/2005 | Yeom | |
| 7,036,076 B2 | 4/2006 | Anwar | |
| 7,073,127 B2 | 7/2006 | Zhao et al. | |
| 7,075,513 B2 | 7/2006 | Silfverberg et al. | |
| 7,124,164 B1 | 10/2006 | Chemtob | |
| 7,203,479 B2 | 4/2007 | Deeds | |
| 7,225,257 B2 | 5/2007 | Aoike et al. | |
| 7,242,389 B1 | 7/2007 | Stern | |
| 7,246,316 B2 | 7/2007 | Furlong et al. | |
| 7,251,786 B2 | 7/2007 | Wynn et al. | |
| 7,269,787 B2 | 9/2007 | Amitay et al. | |
| 7,299,193 B2 | 11/2007 | Cragun et al. | |
| 7,299,405 B1 | 11/2007 | Lee et al. | |
| 7,299,418 B2 | 11/2007 | Dieberger | |
| 7,401,300 B2 | 7/2008 | Murmi | |
| 7,426,297 B2 | 9/2008 | Zhang et al. | |
| 7,454,439 B1 | 11/2008 | Gansner | |
| 7,466,334 B1 | 12/2008 | Baba | |
| 7,478,129 B1 * | 1/2009 | Chemtob | 709/204 |
| 7,512,906 B1 | 3/2009 | Baier et al. | |
| 7,554,576 B2 | 6/2009 | Erol et al. | |
| 7,571,210 B2 * | 8/2009 | Swanson et al. | 709/204 |
| 7,590,941 B2 | 9/2009 | Wee et al. | |
| 7,599,989 B2 | 10/2009 | Stevens et al. | |
| 7,636,754 B2 * | 12/2009 | Zhu et al. | 709/205 |
| 7,669,141 B1 | 2/2010 | Pegg | |
| 7,679,518 B1 | 3/2010 | Pabla et al. | |
| 7,730,411 B2 | 6/2010 | Chotai et al. | |
| 7,743,098 B2 | 6/2010 | Anglin et al. | |
| 7,764,247 B2 | 7/2010 | Blanco et al. | |
| 7,770,116 B2 | 8/2010 | Zhang et al. | |
| 7,799,706 B2 | 9/2010 | Yeom | |
| 7,911,409 B1 | 3/2011 | Chatterjee et al. | |
| 7,919,142 B2 * | 4/2011 | Yeom et al. | 427/248.1 |
| 7,962,525 B2 * | 6/2011 | Kansal | 707/802 |
| 7,992,089 B2 | 8/2011 | Murray et al. | |
| 8,032,832 B2 | 10/2011 | Russ et al. | |
| 8,099,458 B2 * | 1/2012 | Burtner et al. | 709/204 |
| 2001/0040592 A1 | 11/2001 | Foreman et al. | |
| 2002/0060201 A1 | 5/2002 | Yeom | |
| 2002/0143877 A1 | 10/2002 | Hackbarth et al. | |
| 2003/0020805 A1 | 1/2003 | Allen et al. | |
| 2003/0122863 A1 | 7/2003 | Dieberger et al. | |
| 2003/0137539 A1 | 7/2003 | Dees | |
| 2003/0142133 A1 | 7/2003 | Brown et al. | |
| 2003/0158900 A1 | 8/2003 | Santos | |
| 2003/0209519 A1 | 11/2003 | Yeom | |
| 2003/0222890 A1 | 12/2003 | Salesin et al. | |
| 2004/0016876 A1 | 1/2004 | Yeom | |
| 2004/0024822 A1 | 2/2004 | Werndorder et al. | |
| 2004/0027370 A1 | 2/2004 | Jaeger | |
| 2004/0030992 A1 | 2/2004 | Molsa et al. | |
| 2004/0062383 A1 | 4/2004 | Sylvain | |
| 2004/0128350 A1 | 7/2004 | Topfl et al. | |
| 2004/0150627 A1 | 8/2004 | Luman et al. | |
| 2004/0196286 A1 | 10/2004 | Guzik | |
| 2004/0254998 A1 | 12/2004 | Horvitz | |
| 2004/0263636 A1 | 12/2004 | Cutler et al. | |
| 2004/0267701 A1 | 12/2004 | Horvitz et al. | |
| 2005/0005025 A1 | 1/2005 | Harville et al. | |
| 2005/0018828 A1 | 1/2005 | Nierhaus et al. | |
| 2005/0055625 A1 | 3/2005 | Kloss | |
| 2005/0081160 A1 | 4/2005 | Wee et al. | |
| 2005/0088410 A1 | 4/2005 | Chaudhri | |
| 2005/0091571 A1 | 4/2005 | Leichtling | |
| 2005/0125246 A1 | 6/2005 | Muller et al. | |
| 2005/0125717 A1 | 6/2005 | Segal et al. | |
| 2005/0138570 A1 | 6/2005 | Good et al. | |
| 2005/0171830 A1 | 8/2005 | Miller et al. | |
| 2006/0010023 A1 | 1/2006 | Tromczynski et al. | |
| 2006/0010197 A1 | 1/2006 | Overden | |
| 2006/0067250 A1 | 3/2006 | Boyer et al. | |
| 2006/0080610 A1 | 4/2006 | Kaminsky | |
| 2006/0082594 A1 | 4/2006 | Vafiadis et al. | |
| 2006/0132507 A1 | 6/2006 | Wang | |
| 2006/0136828 A1 | 6/2006 | Asano | |
| 2006/0143063 A1 | 6/2006 | Braun et al. | |
| 2006/0143064 A1 | 6/2006 | Mock et al. | |
| 2006/0146765 A1 | 7/2006 | Van De Sluis et al. | |
| 2006/0161585 A1 | 7/2006 | Clarke et al. | |
| 2006/0167996 A1 | 7/2006 | Orsolini et al. | |
| 2006/0168533 A1 | 7/2006 | Yip et al. | |
| 2006/0171515 A1 | 8/2006 | Hintermeister et al. | |
| 2006/0184872 A1 | 8/2006 | Dontcheva et al. | |
| 2006/0195587 A1 | 8/2006 | Cadiz et al. | |
| 2006/0213443 A1 | 9/2006 | Yeom | |
| 2006/0234735 A1 | 10/2006 | Digate et al. | |
| 2006/0239212 A1 | 10/2006 | Pirzada et al. | |
| 2006/0259875 A1 | 11/2006 | Collins et al. | |
| 2006/0282759 A1 | 12/2006 | Collins et al. | |
| 2007/0005752 A1 | 1/2007 | Chawla et al. | |
| 2007/0100937 A1 | 5/2007 | Burtner et al. | |
| 2007/0112926 A1 | 5/2007 | Brett et al. | |
| 2007/0150583 A1 | 6/2007 | Asthana et al. | |
| 2007/0174389 A1 | 7/2007 | Armstrong | |
| 2007/0185870 A1 | 8/2007 | Hogue et al. | |
| 2007/0189487 A1 | 8/2007 | Sharland et al. | |
| 2007/0214423 A1 | 9/2007 | Teplov et al. | |
| 2007/0219645 A1 | 9/2007 | Thomas et al. | |
| 2007/0226032 A1 | 9/2007 | White | |
| 2007/0245238 A1 | 10/2007 | Fugitt et al. | |
| 2007/0253424 A1 | 11/2007 | Herot et al. | |
| 2007/0276909 A1 | 11/2007 | Chavda et al. | |
| 2007/0279416 A1 | 12/2007 | Cobb et al. | |
| 2007/0294612 A1 | 12/2007 | Drucker et al. | |
| 2007/0300185 A1 | 12/2007 | Macbeth et al. | |
| 2008/0005235 A1 | 1/2008 | Hegde | |
| 2008/0008458 A1 | 1/2008 | Gudipaty et al. | |
| 2008/0022225 A1 | 1/2008 | Erl | |
| 2008/0040187 A1 | 2/2008 | Carraher et al. | |
| 2008/0059889 A1 | 3/2008 | Parker et al. | |
| 2008/0065580 A1 | 3/2008 | Spence et al. | |
| 2008/0084984 A1 | 4/2008 | Levy et al. | |
| 2008/0098328 A1 | 4/2008 | Rollin et al. | |
| 2008/0114844 A1 | 5/2008 | Sanchez et al. | |
| 2008/0115076 A1 | 5/2008 | Frank et al. | |
| 2008/0136897 A1 | 6/2008 | Morishima et al. | |
| 2008/0189624 A1 | 8/2008 | Chotai et al. | |
| 2008/0239995 A1 | 10/2008 | Lee et al. | |
| 2008/0263460 A1 | 10/2008 | Altberg | |
| 2008/0276174 A1 | 11/2008 | Hintermeister et al. | |
| 2008/0288889 A1 | 11/2008 | Hunt et al. | |
| 2008/0300944 A1 | 12/2008 | Surazski et al. | |
| 2008/0303746 A1 | 12/2008 | Schlottmann et al. | |
| 2008/0307322 A1 | 12/2008 | Stochosky et al. | |
| 2008/0320082 A1 | 12/2008 | Kuhlke et al. | |
| 2009/0006980 A1 | 1/2009 | Hawley | |
| 2009/0006982 A1 | 1/2009 | Curtis et al. | |
| 2009/0019367 A1 | 1/2009 | Cavagnari et al. | |
| 2009/0043856 A1 | 2/2009 | Darby | |
| 2009/0055739 A1 | 2/2009 | Murillo et al. | |
| 2009/0089055 A1 | 4/2009 | Caspi | |
| 2009/0094367 A1 | 4/2009 | Song et al. | |
| 2009/0109180 A1 | 4/2009 | Do | |
| 2009/0119255 A1 | 5/2009 | Frank et al. | |
| 2009/0119604 A1 | 5/2009 | Simard | |
| 2009/0138552 A1 | 5/2009 | Johnson et al. | |
| 2009/0138826 A1 | 5/2009 | Barros | |
| 2009/0183095 A1 | 7/2009 | Deitsch | |
| 2009/0204671 A1 | 8/2009 | Hawkins et al. | |
| 2009/0222741 A1 | 9/2009 | Shaw et al. | |
| 2009/0234721 A1 | 9/2009 | Bigelow et al. | |
| 2009/0235177 A1 | 9/2009 | Saul et al. | |
| 2009/0254843 A1 | 10/2009 | Van Wie et al. | |
| 2009/0265632 A1 | 10/2009 | Russ et al. | |
| 2009/0282339 A1 | 11/2009 | Van Melle et al. | |
| 2009/0309846 A1 | 12/2009 | Trachtenberg | |
| 2009/0313584 A1 | 12/2009 | Kerr et al. | |
| 2009/0319562 A1 | 12/2009 | Holm-Petersen et al. | |
| 2010/0031152 A1 | 2/2010 | Villaron et al. | |
| 2010/0037151 A1 | 2/2010 | Ackerman et al. | |
| 2010/0058201 A1 | 3/2010 | Harvey et al. | |
| 2010/0097331 A1 | 4/2010 | Wu | |

(56) References Cited

U.S. PATENT DOCUMENTS

| | | | |
|---|---|---|---|
| 2010/0131868 A1 | 5/2010 | Chawla et al. |
| 2010/0149307 A1 | 6/2010 | Iyer et al. |
| 2010/0235216 A1 | 9/2010 | Hehmeyer et al. |
| 2010/0251140 A1 | 9/2010 | Tipirneni |
| 2010/0268705 A1 | 10/2010 | Douglas et al. |
| 2010/0306004 A1 | 12/2010 | Burtner et al. |
| 2010/0306018 A1 | 12/2010 | Burtner et al. |
| 2010/0324963 A1 | 12/2010 | Gupta et al. |
| 2011/0113351 A1 | 5/2011 | Phillips |
| 2011/0137894 A1 | 6/2011 | Narayanan et al. |
| 2011/0239142 A1 | 9/2011 | Steeves et al. |
| 2011/0282871 A1 | 11/2011 | Seefeld et al. |
| 2012/0075337 A1 | 3/2012 | Rasmussen et al. |
| 2012/0129347 A1 | 5/2012 | Yeom |
| 2012/0144325 A1 | 6/2012 | Mital et al. |
| 2012/0150577 A1 | 6/2012 | Berg |
| 2012/0150863 A1 | 6/2012 | Fish |
| 2012/0159347 A1 | 6/2012 | Fish |
| 2012/0159355 A1 | 6/2012 | Fish |
| 2012/0166985 A1 | 6/2012 | Friend |
| 2013/0035853 A1 | 2/2013 | Stout et al. |
| 2013/0091440 A1 | 4/2013 | Kotler et al. |
| 2013/0091465 A1 | 4/2013 | Kikin-Gil et al. |
| 2013/0097544 A1 | 4/2013 | Parker et al. |

FOREIGN PATENT DOCUMENTS

| | | |
|---|---|---|
| KR | 10-0380660 | 4/2003 |
| KR | 10-0668075 | 1/2007 |
| KR | 10-0691618 | 3/2007 |
| KR | 10-0786635 | 12/2007 |
| KR | 10-0959640 | 5/2010 |
| WO | WO 02/061682 | 8/2002 |

OTHER PUBLICATIONS

The Beginner's Guide to Data Visualization, Tableau Software, http://www.tableausoftware.com/beginners-data-visualization, pp. 1-6 (Date Retrieved Jul. 21, 2010).

Bell, David et al., "Sensory Semantic User Interfaces (SenSUI) (position paper)", Fluiditv Research Grouo: Brunei University. (Oct. 20, 2009), 14 pages.

Bunzel, Tom "Using Quindi Meeting Capture", retrieved from http://www.informit.com/guides/content.as[2x?g=msoffice&seg Num=220, (Sep. 1, 2006), 3 pages.

Cathy, et al., "Mindshift Innovation", Oct. 4, 2007, 2 pages.

"Cisco Context-Aware Mobility Solution: Presence Applications", retrieved from https://www.cisco.com/en/US/solutions/collateral/ns340/ns394/ns348/ns788/brochure c22-497557.html on Sep. 7, 2010, 5 pages.

"Collaboration within the Telepresence Experience"—Published Date: Jan. 2010, http://www.wrplatinum.com/Downloads/11056.aspx, 11 pgs.

"CounterPoint: A Zooming Presentation Tool"; http://web.archive.org/web/20050205082738/www.cs.umd.edu/hcil/counterpoint/, Archive.org 2005 Capture, 3 pgs.

"Create treemaps using easy drag and drop interactions"—Retrieved Date: Jul. 21, 2010, http://www.magnaview.nl/treemap/, 1 pg.

"CSS Max-width Property" by W3Schools, archived by Internet Archive WaybackMachine Jun. 8, 2007, downloaded Nov. 16, 2012; 1 pg.

"Datapoint". Version 1.1, 1997-2007, FileDudes.com, 2 pages.

Derthick et al., "An Interactive Visualization Environment for Data Exploration", Published Date: Aug. 1997, http://www.cs.cmu.edu/~sage/KDD97.html, 9 pages.

"Description for SharePoint Meeting Manager", Retrieved from: <http://www.softQicks.neUsoftware/Business/Project-ManagemenUSharePoint-Meeting-Manaaer-47146.htm> on Oct. 11, 2010 (Jul. 27, 2009),2 pages.

Fernando et al., "Narrowcasting Attributes for Presence Awareness in Collaborative Virtual Environments", Published Date: 2006, http://ieeexplore.eee.org/stamp/stamp.jsp?tp=&arnumber=4019930, 6 pgs.

"Free PhotoMesa 3.1.2 (Windows)", retrieved on Dec. 28, 2007 at <<http://www.windsorinterfaces.com/photomesa.shtml>>, Windsor Interfaces Inc., 3 pages.

Fruchter, Renate "Brick & Bits & Interaction (BBI)", http://www.ii.ist.i.kyotou.ac.io/sid/sid2001/oaoers/oositions/bricksbitsinteraction.odf (2001), 4 pages.

GeoTime, Retrieved Jul. 19, 2010, http://www.geotime.com/Product/GeoTime-(1)/Features—Benefits.aspx, 7 pgs.

Hewagamage, et al., Interactive Visualization of Spatiotemporal Patterns Using Spirals on a Geographical Map, Published 1999, http://ieeexplore.ieee.org/stamp/stamp.jsp?arnumber=00795916, 8 pgs.

Kang, et al. Effects of Lateral Charge Spreading on the Reliability of TANOS (TaN/AIO/SiN/Oxide/Si) NAND Flash Memo, IEEE 45th Annual International Reliability Physics Conference, Phoenix, AZ, 167-169 (3 pages) (2007).

Kim, Hyun H., et al., "SmartMeeting: CMPT 481/811 Automatic Meeting Recording System", http://www.cs.usask.ca/grads/hyk564/homePage/811/CM PT%20811 %20fmal.doc, (2004),7 pages.

Lai, et al. Fluorinated ALD $Al_2O_3$ Gate Dielectrics by CF4 Plasma, IEEE Semiconductor Device Research Symposium (2 pages) (2005).

Lai, et al. Study of the Erase Mechanism of MANOS (Metal/$Al_2O_3$/SiN/$SiO_2$/Si) Device, IEEE Elec Dev Lett 28,643-646 (4 pages) (2007).

Lee, et al. A Novel SONOS Structure of $SiO_2$/SiN/$Al_2O_3$ with TaN Metal Gate for Multi-Giga Bit Flash Memories, IEDM '03 Technical Digest, 26.5.1-26.5.4 (4 pages) (2003).

Lu, et al. Non-Volatile Memory Technology—Today and Tomorrow, Keynote Address, Proceedings of the 13th IPFA, Singapore (6 pages) (2006).

"Meeting Center Using Video in Your Meetings"; Retrieved at <<http://www.oucs.ox.ac.uk/webex/Windows/Video.pdf>>, May 13, 2009, 2 pgs.

"Meeting Management Software", Retrieved from: <http://workingsmarter. typepad .com/my weblog/2004/12/meeting managem. html> on Oct. 11, 2010, (Dec. 10, 2004), 2 pages.

"Microsoft® Office Live Meeting Feature Guide", Microsoft Corporation, Available at <http://download.microsoft.com/download/8/0/3/803f9 ba6-5e 12-4b40-84d9-d8a91073e3dc/LiveMeeting.doc>,(Jan. 2005), pp. 1-17.

Mitrovic, Nikola et al., "Adaptive User Interface for Mobile Devices", retrieved from http://citeseerx.ist.pssu.edu/viewdoc/download?doi=10.1.1.140.4996&rep=repl &type=pdf. (2002), 15 pages.

"Online Calendar & Group Scheduling": MOSAIC Technologies, retrieved from ,http://www.webexone.com/Brandded/ID. asp?brandid=2348&pg=%20AppCalendar. On Apr. 29, 2009, 4 pgs.

Peddemors, A.J.H. et aL., "Presence, Location and Instant Messaging in a Context-Aware Application Framework", retrieved from htt://citeseerx.ist.psu.edu/viewdoc/download?doi=10.11.1.98.3321 &rep=rep1&type=pdf; 4th International Conference on Mobile Data Management MDM (2003),6 pages.

Photodex Corporation; "ProShow Producer Feature Overview"; http://www.photodex.com/products/producer/features.html; 2008; 2 Pgs.

Rudnicky, Alexander I., et al., "Intelligently Integrating Information from Speech and Vision to Perform Light-weight Meeting Understanding", retrieved from http://citesseerx.ist.psu.edu/viewdoc/download?doi=10.1.1.126.1733&rep=rep1 &type=pdf. (Oct. 2005), 6 pages.

Shaw, "Create Pan and Zoom Effects in PowerPoint", 2007, Microsoft Corporation, 10 pages.

Thomas, "Through-Walls Collaboration"—Published Date: 2009, http://ieeexploreleee.org/stamp/stamp.jsp?tp=&arnumber=5165559, 8 pgs.

Visualize and Map SalesForce Leads with SpatialKey, Retrieved Jul. 19, 2010, http://www.spatialkey.com/support/tutorials/visualize-and-map-salesforce-leads-with-spatialkey-part-ii/, 8 pgs.

Watson, Richard "What is Mobile Presence?", Retrieved from http://reseller.tmcnet.com/topics/unified-communications/articles/54033-what-mobile-presence.htm, (Apr. 10, 2009), 4 pages.

Wempen, F., "PowerPoint 2007 Bible"; Feb. 27, 2007, John Wiley & Sons, 27 pgs. Excerpt.

(56) References Cited

OTHER PUBLICATIONS

Weverka, "PowerPoint 2007 All-in-One Desk Reference for Dummies" Jan. 2007, Published by Wiley Publishing, 8 pgs.
Yu, Shoou-Jong et al., "Who Said What When? Capturing Important Moments of a Meeting", retrieved from http://repository.cmu. edu/cgi/viewcontent.cgi?article= 1003&context=silicon valley; Technical Report, (Apr. 10-15, 2010),7 pages.
Zenghong, Wu et al., "Context Awareness and Modeling in Self-Adaptive Geo-Information Visualization", retrieved from http://icaci.org/documents/ICC_proceedings/ICC2009/html/refer/17_1.pdf on Aug. 30, 2010, 13 pages.
ZuiPrezi Ltd.; "ZuiPrezi Nonlinear Presentation Editor"; http://zuiprezi.kibu.hu/; 2007; 2 Pgs.
Office Action mailed Mar. 3, 2009, in U.S. Appl. No. 11/260,515.
Office Action mailed Dec. 11, 2009, in U.S. Appl. No. 11/260,515.
Office Action mailed Sep. 30, 2010, in U.S. Appl. No. 11/260,515.
Office Action mailed Feb. 24, 2011, in U.S. Appl. No. 11/260,515.
Office Action mailed Oct. 5, 2011, in U.S. Appl. No. 12/472,101).
Office Action mailed Mar. 28, 2012, in U.S. Appl. No. 12/472,101.
Office Action mailed Jun. 4, 2012, in U.S. Appl. No. 12/965,965.
Office Action mailed Nov. 8, 2012, in U.S. Appl. No. 12/965,965.
Office Action mailed Apr. 11, 2013, in U.S. Appl. No. 13/253,886.
Office Action mailed Aug. 12, 2013, in U.S. Appl. No. 13/272,832.
Lai, et al. Fluorine Effects on the Dipole Structures of the $Al_2O_3$ Thin Films and Characterization by Spectroscopic Ellipsometry, Appl Phys Lett 90, 172904-1-172904-3 (4 pages including cover page) (2007).
Chinese Fourth Office Action dated Nov. 21, 2013 in Appln No. 200980137757.5, 11 pgs.
Office Action mailed Sep. 25, 2013, in U.S. Appl. No. 12/184,174.
"Activity Explorer: Activity-centric Collaboration from Research to Product," IBM Systems Journal, IBM®, 23 pages accessed on Feb. 3, 2009, accessed at: http://www.research.ibm.com/journal/sj/454 /geyer.html.
Adams, et al., "Distributed Research Teams: Meeting Asynchronously in Virtual Space", Institute of Electrical and Electronics Engineers (1999), 17 pages.
"Adobe Connect", Retrieved from: <http://www.adobe.com/acom/connectnow/> on Oct. 11, 2010, (Sep. 16, 2010), 3 pages.
"Adobe ConnectNow", Retrieved from: <http://www.adobe.com/acom/connectnow/> on Oct. 13, 2010, (2010), 6 pages.
"An Overview of Aabel 3 Features"—Retrieved Date: Jul. 21, 2010, http://www.gigawiz.com/Aabel.html, 19 pgs.
Gallegos, D., et al. "CounterPoint User Manual" class project for Charles Paine at the University of New Mexico, Downloaded from Archive. Org 2005 capture, http://web.archive.org/web/20050205082738/www.cs.umd.edu/hcil/counterpoint/, 21 pgs.
GeoTime, Retrieved Jul. 19, 2010, http://www.geotime.com/Product/GeoTime-(1)/Features---Benefits.aspx, 7 pgs.
Good et al. (2001) "CounterPoint: Creating Jazzy Interactive Presentations"; HCIL Tech Report #2001-03, University of Maryland, College Park, MD 20742, 9 pgs.
"GoToMeeting", Retrieved from: <httQ://www.gotomeeting.com/fec/online meeting> on Oct. 11, 2010, 1 page.
Grass Roots Software; "Freepath-EDU Nonlinear Presentation Software"; http://www.fullcompass.com/product/233150.html; 3 Pgs.
Greenberg et al.; "Human and Technical Factors of distributed Group Drawing Tools," Interacting with Computers 4 (1), Dec. 1992, Butterworth-Heinemann (Special edition on CSCW, Tom Rodden ed.) pp. 364-392.
Hewagamage, et al., Interactive Visualization of Spatiotemporal Patterns Using Spirals on a Geographical Map, Published 1999, http://ieeexploreleee.org/stamp/stamp.jsp?arnumber=00795916, 8 pgs.
Hupfer et al., "Introducing Collaboration into an Application Development Environment," CSCW '04, Nov. 6-10, 2004, 4 pages.
Ionescu, Arna et al., "Workspace Navigator: Tools for Capture, Recall and Reuse using Spatial Cues in an Interactive Workspace", Stanford Technical Re[2ort TR2002-04 htto://bci.stanford.edu/research/wksocNavTR.odf (2002), 16 pages.
Izadi et al., "Dynamo: A public interactive surface supporting the cooperative sharing and exchange of media"—Published Date: Apr. 2007, http://hci.stanford.edu/publications/2007/range-wip-final.pdf, 10 pgs.
Ju, Wendy et al., "Where the Wild Things Work: Capturing Shared Physical Design Workspaces"; Stanford University, CSCW '04, Nov 601-, pp. 533-541.
Karlson, et al., "Courier: A Collaborative Phone-Based File Exchange System"; Retrieved at <<http://docs.google.com/viewer?a=v&q=cache'Mb2OKecuT1kj:citeseerx.ist.psu.edu/viewdoc/download%3Fdoi%3D10.1.1.146.360%26rep%3Drep1%26type%3Dpdf=collaborative=document=navigation=visual=display=participant=device&hl=en&pid=b1srcid=ADGEESgArWqUU1B_J2heHCEm78A3YhBLNjwOrzUuQeMSHPm8FebYGzDX9mSFKGC6RLq13MU25cynt1Hk5zlomCFFyGe8wyfYgwMNhwzx8McZbUILOOg1zr7WR7MwmX5lgeiRZXKTqj&sig=AHIEtbO.
Kim, Hyun H., et al., "SmartMeeting: CMPT 481/811 Automatic Meeting Recording System", http://www.cs.usask.ca/grads/hyk564/homePage/811/CM PT%20811 %20final.doc, (2004), 7 pages.
Little, High-End Business Intelligence with Data Visualization for WPF 4, Published Jun. 29, 2010, http://www.codeproject.com/KB/showcase/DataVisualizationWPF4.aspx, 7 pgs.
"Meet mimio—The Digital Meeting Assistant", Mayflower Business Systems Limited; http://www.kda.co.uk/mimio1/whiteQaQer.html, (May 1999), 10 pages.
"Meeting Center Using Video in Your Meetings"; Retrieved at <<http://www.oucs.ox.ac.uk/webex/Windows/Video.pdf >>, May 13, 2009, 2 pgs.
"Meeting Management Software", Retrieved from: <http://workingsmarter. typepad .com/myweblog/2004/12/meeting managem. html> on Oct. 11, 2010, (Dec. 10, 2004), 2 pages.
"Microsoft Office Communicator 2007 Getting Started Guide", retrieved from http://www.ittdublin.ie/media/Media 22233 en.odf (Jul. 2007), 77 pages.
"Microsoft® Office Live Meeting Feature Guide", Microsoft Corporation, Available at <http://download.microsoft.com/download/8/0/3/803f9 ba6-5e 12-4b40-84d9-d8a91073e3dc/LiveMeeting.doc>, (Jan. 2005), pp. 1-17.
Mitrovic, Nikola et al., "Adaptive User Interface for Mobile Devices", retrieved from http://citeseerx.ist.pssu.edu/viewdoc/download?doi=10.1.1.140.4996&rep=rep1 &type=pdf. (2002), 15 pages.
Moran et al., "Tailorable Domain Objects as Meeting Tools for an Electronic Whiteboard"—Published Date: 1998, http://www.fxpal.com/people/chiu/paper-mvc-CSCW98.pdf, 10 pgs.
Nelson, Just Around the Corner: Visual Fusion 4.5, Published Sep. 30, 2009, http://www.idvsolutions.com/press_newsletter_vfx45_silverlight.aspx, 6 pgs.
"Online Calendar & Group Scheduling": MOSAIC Technologies, retrieved from, http://www.webexone.com/Brandded/ID.asp?brandid=2348&pg=%20AppCalendar. On Apr. 29, 2009, 4 pgs.
Peddemors, A.J.H. et al., "Presence, Location and Instant Messaging in a Context-Aware Application Framework", retrieved from htt://citeseerx.ist.psu.edu/viewdoc/download?doi=10.11.1.98.3321 &rep=rep1 &type=pdf; 4th International Conference on Mobile Data Management MDM (2003), 6 pages.
"The Platinum Experience of Collaboration—CollaboratorHYPERMAX", Retrieved Date: Jul. 16, 2010, http://www.businessoctane.com/group_telepresence.php, 7 pgs.

\* cited by examiner

MULTI-USER AND MULTI-DEVICE COLLABORATION

RELATED APPLICATIONS

This application is related to U.S. patent application Ser. No. 13/253,886, titled "Workspace Collaboration Via A Wall-Type Computing Device", filed Oct. 5, 2011, the entire content of which is hereby incorporated by reference.

BACKGROUND

With the advent of computers and computer systems, users have been afforded useful technologies for managing documents of various types, data of various types, calendar information, contacts information, and the like. Users are able to create and share useful presentations, charts, images, and the like. However, one area that is often lacking is the ability of the multiple users, particularly where multiple users are operating from one or more different computing devices, to collaborate freely with a multitude of data, documents, presentations, images, and the like. Indeed, it is not uncommon for users to gather in a conference room armed with printed paper documents, presentations, or other, followed by hand-writing collaborative information on a board, and followed by transcription of such information onto one or more notepads or into one or more computing devices. Such a collaborative experience typically fails to efficiently utilize the valuable time of participants, and particularly, valuable information is often lost owing to a failure to record and/or distribute the information in a meaningful way.

It is with respect to these and other considerations that the present invention has been made.

SUMMARY OF THE INVENTION

Embodiments of the present invention solve the above and other problems by providing for a multi-user, multi-computing device collaborative work experience. According to an embodiment, a collaborative workspace application allows for the sharing of a multitude of application functionality and associated documents and/or data across multiple devices and/or multiple display surfaces. A multitude of computing devices, including wired and wireless personal computers, laptop computers, servers, handheld mobile computing devices, for example, mobile telephones, tablet type computers, slate type computers and the like, may be linked together to allow users of such devices to engage in a collaborative work session.

According to one embodiment, a central computing surface, for example, a wall type display surface or display screen may serve as a focal point for a collaborative work session. One or more computing devices associated with one or more users may be operatively associated with the central computing surface for displaying documents or other data from the one or more computing devices to the central computing surface. Alternatively, the wall type display surface or display screen may contain its own computing functionality for displaying any desired documents or other data without interaction with other computing devices.

Upon commencement of a given collaborative work session, a work session or meeting file store may be created and stored for the work session. Users desiring to join the collaborative work session may log into the session. Once a given user is logged into the work session, an image, such as a photograph or avatar for the user, may be displayed on the central computing surface along with information for the user showing his/her name, presence status, and other valuable information. Alternatively, users may join a collaborative work session without logging into the session. For example, users may be joined to a session because of their inclusion in a collaborative workspace or team to which the collaborative work session is directed. Or, if log-in is required for a given session, such log-in may be done passively, for example, upon entrance of a given user to a room where a session in being conducted as detected by face recognition, voice recognition, RFID detection of a card or device being carried by the user or by other information, such as presence data showing the user is in the room or proximity of the collaborative work session.

Next, users who are part of the collaborative work session may display on the central computing surface one or more agenda items, documents, data, images, and the like. Displayed content may be edited, manipulated, revised, etc., and all content may be saved to the work session or meeting file store for subsequent use by work session users/members. Importantly, content displayed and edited on the central computing surface may be displayed remotely on display surfaces (e.g., computing device display screens) of computing devices operated by users/members of the collaborative work session situated remotely from the central computing surface. According to embodiments, being situated remotely from the central computing surface may include being situated in the same room as the central computing surface but being associated with a computing device not physically connected to the central computing surface, for example, a laptop computer, tablet computer, mobile telephone, etc. Input from such remotely situated users/members (and associated devices) may be displayed on the central computing surface and on other remotely situated but associated devices. Thus, users/members of the collaborative work session may share a multitude of documents and data across multiple devices, and the product of the collaborative work session may be saved in association with the collaborative work session for subsequent use by the users/members of the collaborative work session.

In some collaborative work sessions, the display surface or display screen may be used to provide information about session participants with no interaction with/from the participants (e.g., computing device interaction). For example, information such as names, personal information, communication types in use, etc. may be displayed for adding value to the session without interaction with the display surface or screen via one or more computing devices.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

DETAILED DESCRIPTION

Figure 1:
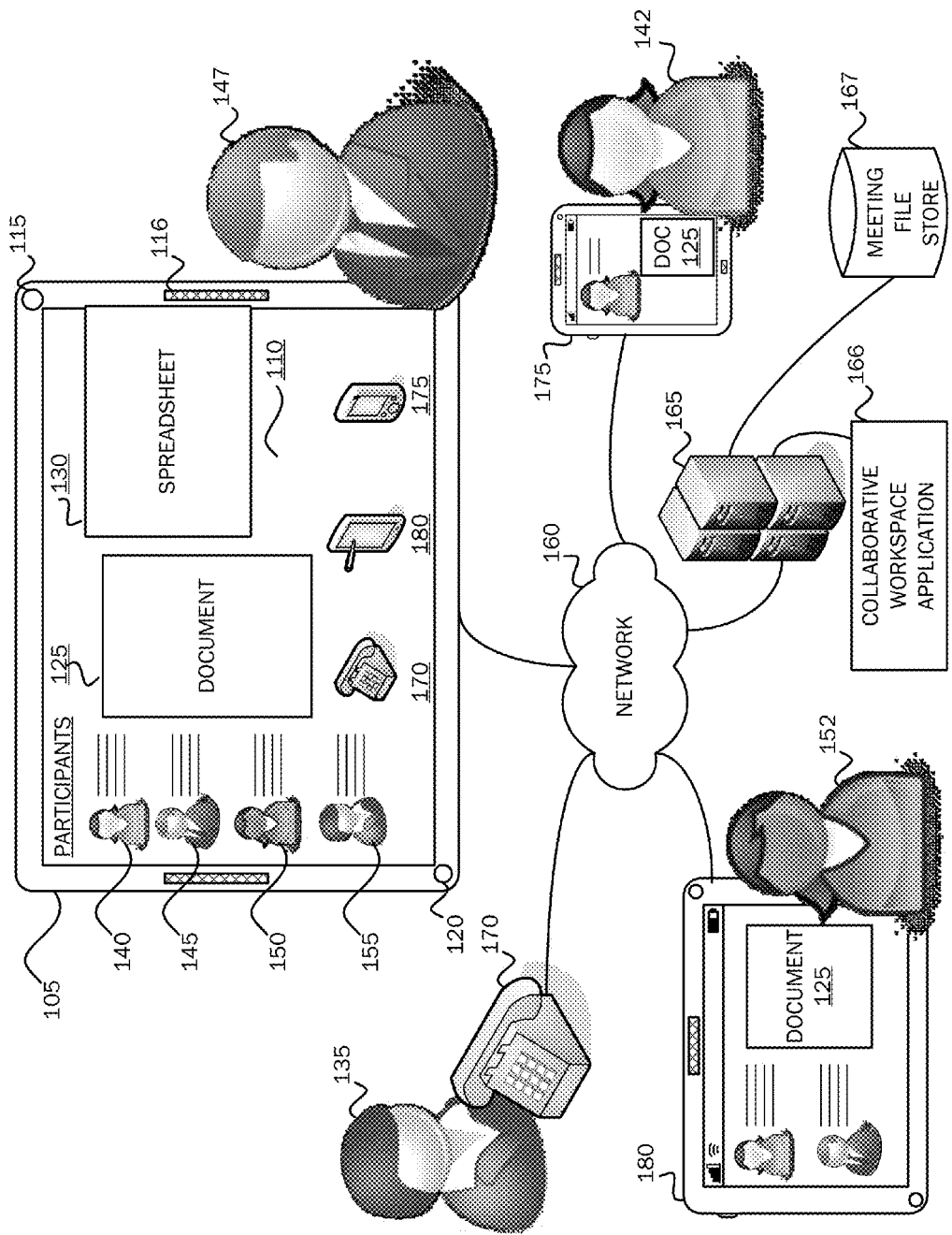
FIG. 1 is a simplified block diagram of a system architecture for a multi-user and multi-device collaborative work session.

As briefly described above, embodiments of the present invention are directed to a multi-user, multi-computing device collaborative work experience. According to embodiments, a plurality of users may log into a collaborative work session from one or more computing devices. That is, each of the plurality of the users may log into and conduct a collaborative work session together in a central location, for example, a conference room, or each of the plurality of users may log into and participate in the collaborative work session from separate remotely situated computing devices that are linked together through a distributed computing network for conducting the collaborative work session. A central computing surface, for example, a wall type display surface or large display screen may be designated as a central display surface for the collaborative work session. Once the plurality of users are logged into the collaborative work session or are otherwise associated with the collaborative work session, identifying information, for example, photographs, images, or avatars representing the plurality of users may be displayed along with other identifying information for the plurality of users on the central computing surface. As users enter or otherwise participate in the collaborative work session, information associated with such participation may be displayed for the users and for the information of other users/members of the collaborative work session.

Content, including documents, images, data, and the like may be displayed on the central computing surface from each of one or more computing devices associated with the collaborative work session and/or from a central work session or meeting file store. Edits, revisions, or any other manipulation of work session content may be performed on the central computing surface, or via any computing device operatively associated with (e.g., networked with) the collaborative work session and operatively associated with the central display screen. Edited content may simultaneously be displayed on display screens associated with any computing devices operated by any participating users of the collaborative work session. Content produced for, displayed for, edited, or otherwise manipulated as part of the collaborative work session may be stored to one or more storage media including a work session or meeting file store for subsequent use by users/members of the collaborative work session.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

FIG. 1 is a simplified block diagram of a system architecture for a multi-user and multi-device collaborative work session. As illustrated in FIG. 1, a plurality of users associated with a plurality of computing devices may be networked together for conducting a collaborative work session. Each of the plurality of users and computing devices illustrated in FIG. 1 are shown to be remotely situated from each other, but as should be appreciated, embodiments of the present invention are equally applicable to a plurality of users engaging in a collaborative work session in a single location, for example, a conference room or other meeting location, wherein all of the functionality described herein may be utilized in a single location. For example, the plurality of users illustrated in FIG. 1 may desire to create and engage in a collaborative work session for developing a new product line for their employer. Each of the users may decide to meet in a single location, for example, a company conference room for developing and/or editing or otherwise manipulating one or more project documents, or one or more of the users belonging to the collaborative work session may join and participate in the collaborative work session from a remote location, for example, from another city, country, building, or any other location from which the user may connect with the collaborative work session, as described herein.

Referring then to FIG. 1, a plurality of applicable computing devices that may be joined together for conducting a collaborative work session are illustrated and described. The display unit 105 is illustrative of a large display screen associated with a computing device operative to display content on the display surface 110. The display unit 105 may also be in the form of an integrated computing device and display. The display unit 105 is also illustrative of a wall type display surface/unit onto which content may be projected from a projection device associated with a computing device, or the unit 105 may be illustrative of a wall type display surface/unit from which rear projection may be utilized for displaying content on the display screen or surface 110 of the display unit 105. According to embodiments, the display unit 105 and associated display surface 110 may be utilized as a central display for users/members of a collaborative work session for displaying a multitude of information about participants and a multitude of various types of content, as will be described below. Alternatively, no display unit may be designated as a central display, and each display unit associated with each computing device associated with a work session may be equally operative as a focal point when the user of each display unit is talking or presenting content. As illustrated in FIG. 1, a user 147 is illustrated in proximity to the unit 105 and is illustrative of one or more users who may be situated in the operating area of the unit 105 for engaging in a collaborative work session.

The telephone device 170 is illustrative of a conventional wired or wireless telephone from which a work session participant 135 may call into the work session for participating in the work session. The computing device 180 is illustrative of a conventional wired or wireless personal computer, a tablet or slate type computing device, a laptop computer, or any other suitable computing device from which a participant 152 may engage in a collaborative work session with other participants by entering, editing, or receiving data through the computing device 180. The device 175 is illustrative of a handheld mobile computing device, for example, a mobile telephone, operated by a participant 142 for entering, editing, or receiving participant information or content associated with the collaborative work session.

According to one embodiment, work session participants may be situated remotely from each other and may engage in a collaborative work session via the devices 170, 175, 180. According to another embodiment, being situated remotely from each other may include the case where the participants are in the same location as the central display unit 105 (e.g., same meeting room as a wall-type computing/display unit 105), and the participants may interact with the central display unit and with each other by providing input via their individual devices 170, 175, 180. In either case, information input via any of the devices 170, 175, 180 may be displayed on the central display unit 105 and may be distributed out to each participant for display on the devices 170, 175, 180.

According to embodiments, prior to the commencement of a collaborative work session, each participant and his/her computing and/or communications devices 170, 175, 180 may register via the collaborative workspace application 166 (described below) for participation in the collaborative work session. Alternatively, all users/members of a given workspace (for example, members of a project to develop a new software application) may be automatically registered for inclusion into the collaborative work session prior to commencement of the session. Registration of users/members with a given work session may be accomplished via an active or passive log-in to the given work session according to a variety of means as described below with reference to FIG. 2.

Referring to the display unit/surface 105, 110 illustrated in FIG. 1, a representation or icon is displayed along the lower edge of the display surface 110 for each computing and/or communication device that is registered or otherwise associated with the collaborative work session. Such representations may be displayed to allow participants to know of the identity of the various computing and/or communications devices that are connected to the session, or such representations may take the form of selectable controls that may be selected to allow access to the session by one or more of those devices. According to another display view, these representations may be displayed next to representations of the users to which they are associated (described below). According to embodiments, information from any of the one or more devices registered with a given work session may be automatically presented onto the display unit/surface 105, 110 or may be shared to the display unit/surface 105, 110 on demand. Likewise, such information may be automatically presented or shared to display surfaces/screens of the various associated devices 170, 175, 180.

A server 165 is illustrative of a local or remote computing/storage device on which may be operated a collaborative work space application 166 operative for connecting the plurality of computing devices associated with the collaborative work session, operative for allowing communications between the participants 135, 142, 147, 152, and operative for allowing retrieval from and storage to a meeting file store 167 at which participant information and content associated with a collaborative work session may be stored.

The network 160 is illustrative of a distributed computing network through which each of the disparate devices illustrated in FIG. 1 may communicate. For example, the network 160 may be an Internet-based network through which each of the devices may communicate via various web services platforms. Similarly, the network 160 may be an intranet-based system operated by an employer of each of the participants of the collaborative work session, and the like. As should be appreciated, in a case where each of the participants and each of the computing devices illustrated herein are situated at a single location, each of the computing devices may be connected directly to the server 165 without being connected through the network 160. Alternatively, each of the computing devices associated via a given work session may be connected to each other as a peer-to-peer network among the computing devices without being connected through the server 165.

According to embodiments, during the operation of a collaborative work session, as described herein, one of the display devices, for example, the display unit 105 may be designated as a central display unit and surface for displaying participant information and work session content received from and passed back to various participants in the collaborative work session. In such a case, the display unit designated as the central display unit/surface for the collaborative work session may be addressable from other participating computing devices to allow information input through participating computing devices to be sent to the designated central display unit 105 via the network 160. For example, if the display unit 105 is designated a central computing surface unit for a given collaborative work session, then data input via the computing devices 180, 175, or information received through the telephone device 170 may be addressed to the device 105 so that input from participants utilizing those devices may be passed directly to and displayed on the central display unit/surface 105, 110. Likewise, information received, displayed and/or edited on the central display unit/surface 105, 110 may be passed back through the network 160 for display on each of the participating computing and/or communication devices 170, 180, 175.

According to one embodiment, the collaborative workspace application 166 is operative to interpret input received from each of the units 105, 170, 180, 175 for addressing the input directly to the designated central display unit 105. That is, information input may be passed through the collaborative workspace application 166 from outside a particular meeting room containing the central computing unit/surface 105, 110 from the units 170, 175, 180 (e.g., messaging from the mobile device 175 to the meeting room via the application 166). Thus, each participant in the collaborative work session operating from one or more of a plurality of networked computing and/or communications devices may contribute information about themselves and may contribute content through the devices for display on each of the devices in addition to display on the designated central display unit/surface 105, 110.

Referring still to FIG. 1, the central display unit 105 includes a display surface 110 on which a variety of attendee information for each of the meeting participants may be displayed and on which a variety of content associated with the collaborative work session may be displayed for editing, updating, or otherwise manipulating in accordance with the desires of the participants of the collaborative work session. As should be appreciated, such information about each of the participants of the collaborative work session and such information about the content associated with the collaborative work session may be displayed on each of the computing devices 175, 180 associated with various participants in the collaborative work session, as described above.

According to embodiments, user input to each of the computing devices and associated display units/screens 105, 175, 180 may be performed according to any of a number of suitable input means. Conventional keystroke/mouse input may be utilized, touch screen input on each of the devices may be utilized, electronic pen/inking (for example, electronic stylus, or user finger touch) input may be utilized, voice input via a microphone operatively associated with each of the devices may be utilized wherein voice commands are converted from speech to text, and resulting text is utilized for providing commands to the collaborative workspace application 166 and for providing text-based input to each of the computing devices 105, 175, 180. In addition, voice input from the telephone device 170 may be received through the network 160, and associated voice content may be converted from speech to text for use in a similar manner.

In addition, one or more gesture-based commands may be received for providing data input to the computing devices 105, 175, 180. According to an embodiment, for purposes of receiving gesture-based input and voice-based input, each of the devices 105, 175, 180 may be coupled with a camera 115 that may be operative to record and capture motions and/or gestures made by a participant 142, 147, 152. Consistent with embodiments of the invention, such a camera may be operative to provide motion detection capable of detecting movement from the participants 142, 147, 152 for interpreting the movements as commands for causing changes in application functionality or changes in content associated with the collaborative work session. For example, a camera may comprise a Microsoft® Kinect® motion capture device comprising a plurality of cameras and a plurality of microphones for capturing both motion and voice or other audio information.

Figure 2:
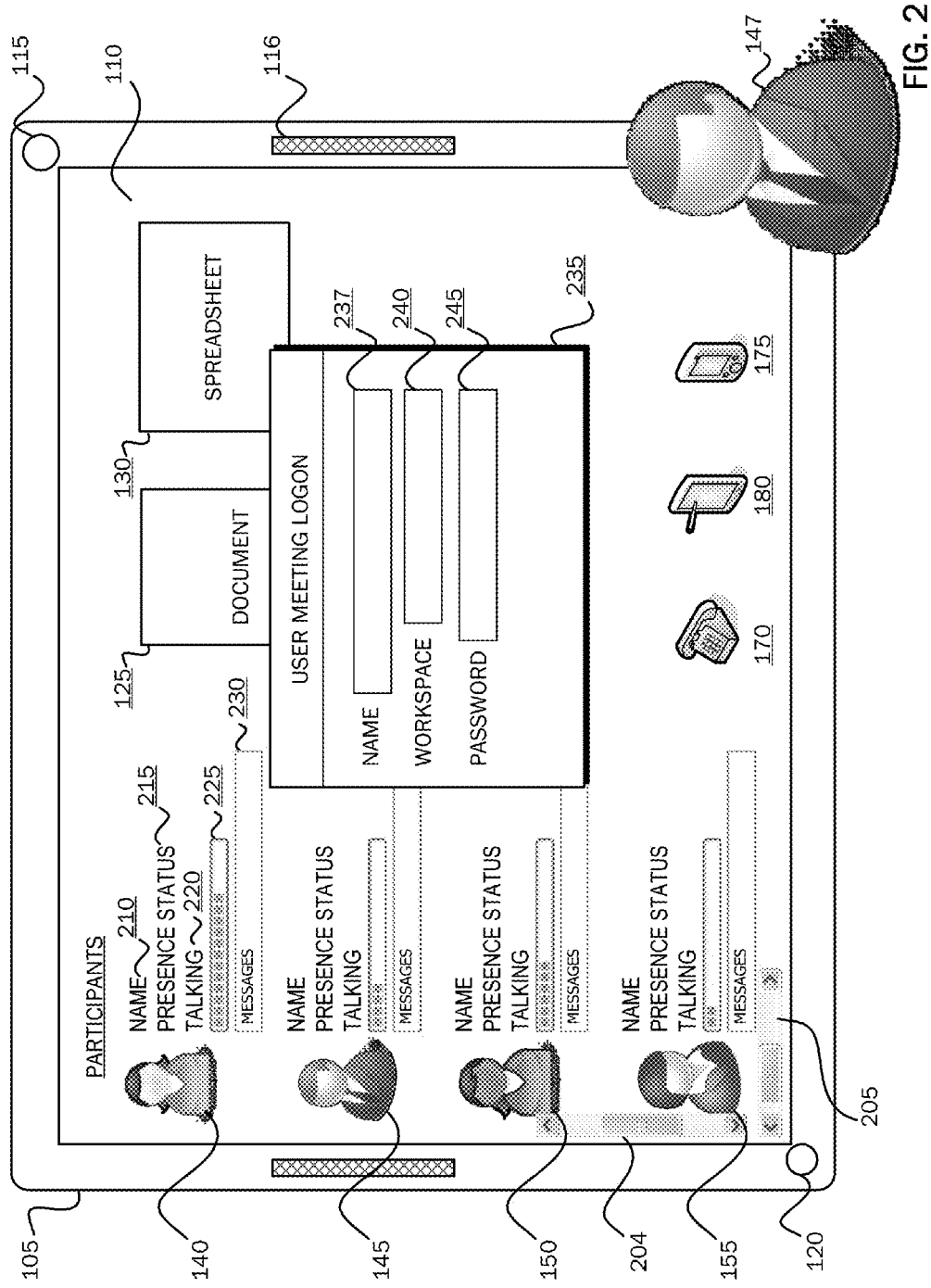
FIG. 2 is a simplified block diagram of a computer-generated display screen showing user and content collaboration in a collaborative work session.

Referring now to FIG. 2, according to one embodiment, as each participant 135, 142, 147, 152 joins a given collaborative work session, each participant may be required to log into the collaborative work session so that identification and other information about each participant may be tracked and displayed for the benefit of other participants, so that computing devices in use by each of the participants may be registered with the collaborative workspace application 166 for communication with the collaborative work session, so that communications received from each of the participants may be passed through the collaborative workspace application 166 for display to other participants, and so that content, for example, documents and/or other data distributed by or edited by each participant may be shared with other participants in the workspace session. As should be appreciated, a user may engage in a collaborative work session without logging into the work session, but such a user may have limited access options to the work session. For example, such a user may be able to review displayed information, but such a user may not be able to display his/her information or content.

According to embodiments, participants may manually log into a work session as described below with reference to FIG. 2, or participants may be automatically logged in based on presence status. For example, if a user enters a room in which the collaborative work session is being conducted, his/her presence may be detected, as described below, and he/she may be automatically logged into the session.

Referring to FIG. 2, a login dialog box or user interface component 235 is illustrated that may pop up on a display screen in use by each joining participant. A participant may be required to enter his/her name 237, identifying information for a workspace or work session 240, and a password 235 for determining and/or authenticating the user's rights and privileges for accessing and joining the desired collaborative work session.

According to other embodiments, a participant may be logged into a given collaborative work session and/or his/her computing devices may be registered for association with the work session according to a variety of other active or passive means in addition to logging in via a login dialog box as illustrated in FIG. 2. According to one embodiment, presence status information for a participant (described below) showing the participant is in a proximity (e.g., same room) of the location of a collaborative work session may be used for automatically logging the participant in or associating the participant with the work session. According to another embodiment, voice recognition, facial recognition, retinal scanning, fingerprint/thumb print/hand print recognition and the like may be used for identifying a participant for logging in or otherwise associating the participant with a given collaborative work session. For example, identification of a participant via facial recognition may be compared against a database of users who may be associated with a given work session, and upon identification and authentication of such a user (if required), the user may be automatically logged into or otherwise associated with the work session to allow information for the participant to be displayed as part of the session as described below. Other suitable identification means such as smartcards, personal identification number (PIN) entry pads, and the like may be used for identifying a potential participant and for logging the participant or otherwise associating the participant with a given work session.

According to another embodiment, a given collaborative work session, including the central computing device 105, 110 may be associated with an electronic calendaring system for assisting in establishing a given work session, for determining presence information for participants (as described below) and for maintaining information about a given work session. For example, the collaborative workspace application 166 may contain its own calendaring functions, or the application 166 may call on the functionality of a separate calendaring application for establishing a given work session. For example, if a calendar entry shows that five participants of a given workspace will conduct a collaborative work session at a given time and location, the workspace application 166 may parse the calendaring function for identities of each of the participants. A room for the session may be automatically reserved, and at the appropriate time, participant information may be automatically displayed on the central computing device 105, 110, and any additional devices 170, 175 and 180 may be automatically registered with the work session to allow information from those devices to be published to the central display device (e.g., wall type display unit). In addition, based on calendaring information for participants, documents and other data from identified participants may be automatically obtained for inclusion in the work session, including for display on the various associated computing devices. Use of such calendaring information may be in response to the sending of a meeting request identifying a set of participants and a meeting location.

Referring still to FIG. 2, once the collaborative work session commences, a variety of information for each participant who has joined the work session may be collected by the collaborative workspace application 166 and may be presented and displayed on each display screen of each computing device operatively associated with and joined to the collaborative work session, including the designated central display unit/space 105, 110 illustrated in FIG. 2. According to an embodiment, a photograph, video of the user, image, avatar, or other identifying object may be displayed for each participant who has joined the collaborative work session. As illustrated in FIG. 2, an avatar 140 has been displayed for participant 142, an avatar 145 has been displayed for participant 147, an avatar 150 has been displayed for participant 152, and an avatar 155 has been displayed for participant 135. As should be appreciated, the use of an image, such as an avatar, may reduce processing needs and thus optimize the processing associated with the collaborative work session as opposed to the use of photographs, live video feeds or the like that may require additional processing time and memory.

Referring still to FIG. 2, a variety of information may be provided on the display for each participant in the collaborative work session. For example, in addition to each participant's name 210, presence status 215 may be provided for each participant. According to embodiments, presence status for each participant may be obtained from a variety of presence status means. Presence status information for each participant may include the participant's current physical location, whether the participant is moving or not, calendar information, for example, whether the participant is in a meeting or other function, and the like. According to embodiments, as presence status for any given participant changes, the change in presence status may be automatically reflected in the display of the presence status for that participant. Presence status may be obtained from calendaring application associated with each participant and may be obtained by the collaborative workspace application 166 from an appropriate storage medium, for example, a calendar data storage medium operated by the employer of the participants. For example, a first participant 142 may have logged into the collaborative work session upon the commencement of the collaborative work session, but that participant may have been called into a different meeting before the end of the collaborative work session. The presence status for that participant may thus change to indicate that he/she is currently engaged in a different meeting to allow other participants in the work session to know of a current presence of the subject participant. Presence status may also be detected by monitoring wireless communications between a participant's mobile devices (e.g., mobile telephone, mobile tablet computing device, laptop computer, and the like) and wireless receivers associated with wireless communications providers or associated with wireless "hot spots," for example, WIFI zones in which the participant is located. Presence status may also be detected by passing location information, for example, location information obtained via the aforementioned calendaring function or location information obtained from a global positioning satellite system associated with a participant's mobile devices to the collaborative workspace application 166. In addition, presence status may be obtained by other means such as radio frequency identification (RFID) devices (e.g., RFID access card) carried by the participant that may be detected when the participant enters an area in which a work session is being conducted.

In addition, without the requirement of participant login to a collaborative work session, a plurality of participants may be associated with a given collaborative workspace that is the subject of a collaborative work session who may have logged into work sessions for the collaborative workspace previously and for whom identification information is presented as illustrated in FIG. 2. For any participant who is a member of the associated collaborative workspace but who has not logged into the present collaborative work session, presence status information 215 may be utilized for determining the location and/or presence status of a particular member of the collaborative workspace at any given time to allow other members of the collaborative workspace to understand why the participant may not be participating in the present collaborative work session.

Whether a given participant is logged in or not, presence status/information may be very useful to other participants engaged in a collaborative work session. For example, if a given participant is particularly important to a given work session and his/her presence status shows "moving" as determined by location determining means associated with his/her mobile device, that presence status may allow other participants to contact the "moving" participant via his/her mobile device to add him/her to the work session. Indeed, such positioning information may be used to give up-to-date presence information for a given participant. For example, when a participant walks into a conference room in which a collaborative work session in being conducted, his/her presence status may change as he/she walks into the room to show that he/she is now in the present in the meeting. Likewise, if the presence status for a potential participant shows the potential participant is in another meeting at this time, then other participants will know that the work session will have to proceed without involvement from the potential participant.

In addition to identifying information and presence status information, information showing the level of participation of various participants may be displayed. For example, an indication 220 of which participant is presently talking/speaking may be provided for each participant engaging in a collaborative work session. Other types of indications 220, for example, avatars with moving lips or other useful graphical displays, may be used to indicate which participant is presently talking. Such graphical information is particularly useful for participants located remotely from the room or area containing the central computing device 105, 110.

As should be appreciated, a microphone associated with each participant, for example, a microphone operatively associated with each participant's computing and/or communication device, or microphones physically located at each station of a conference table, or the like may be used for identifying through voice or other audio input which participant is presently talking during a given collaborative work session. Such information is particularly useful for participants who are engaged in the collaborative work session from remote locations. For example, if one participant is engaged in a collaborative work session from his/her tablet style computing device 180 and is not in the same room with other participants engaged in the collaborative work session, then an indication of which participant is presently talking will be particularly useful to the remotely situated participant in identifying to whom his/her responses should be directed.

Other useful information may be provided such as a metering display 225 for indicating the amount of participation associated with each participant. For example, if a first participant has been talking 50% of the duration of the present collaborative work session, an indication of that percentage of the total session time may be indicated in the meter 225. If another participant has only talked 5% of the total session time involved in the present collaborative work session that indication may likewise be provided. Such information may be useful to participants to allow participants to know whether they are adequately participating in a given work session, or to know whether they are possibly participating too much in a given collaborative work session.

In addition, a messages box 230 may be provided to display text-based messages from participants as opposed to voice communications while other participants are talking. For example, if a first participant desires to send an electronic mail message of "Please display the construction memo" while another participant is presently talking, that message may be sent, and the message may be displayed in the message box 230 associated with the sending participant so that other participants may see the message without requiring the sending participant to interrupt a participant who is presently speaking. For another example, a participant who is late for the present work session may send a message such as "running behind—be there in 10 minutes," and the message may be displayed to allow other participants to know when the tardy participant will join the session. That is, the message box 230 may be used to display information relevant to a participant's attendance or lack thereof in a given work session. As should be appreciated, the display of messages sent by a particular participant may be displayed by the collaborative workspace application 166 in concert with an electronic mail application, text messaging application, speech-to-text transcription application, and the like.

As should be appreciated, the information for participants of the example collaborative work session is illustrated in an ordered alignment along the left side of the example display screen. As should be understood, identifying information for each of the participants may be displayed in a variety of organizational orientations, including a random scattering of information on the display screen or surface, as desired by the participants of the collaborative work session.

According to embodiments, in addition to identification information, presence information and participation information for participants of a given work session, other general information of potential interest to participants may be obtained and displayed by the collaborative workspace application 166. For example, news information relevant to a collaborative work session may be displayed for use or enjoyment by participants, including news items relevant to or associated with participants or work session topics, weather conditions at each location associated with each participant, and the like. For another example, interesting facts, for example, sports scores, associated with participant locations, historical facts associated with participant locations, and the like, may be obtained and displayed. News stories associated with the collaborative work session may be obtained and displayed. Indeed, as should be appreciated, any information of interest to participants may be obtained and displayed in addition to substantive work session content in use by participants. Such collateral information may be useful for starting discussions among participants, building personal relationships among participants, and the like.

Figure 3:
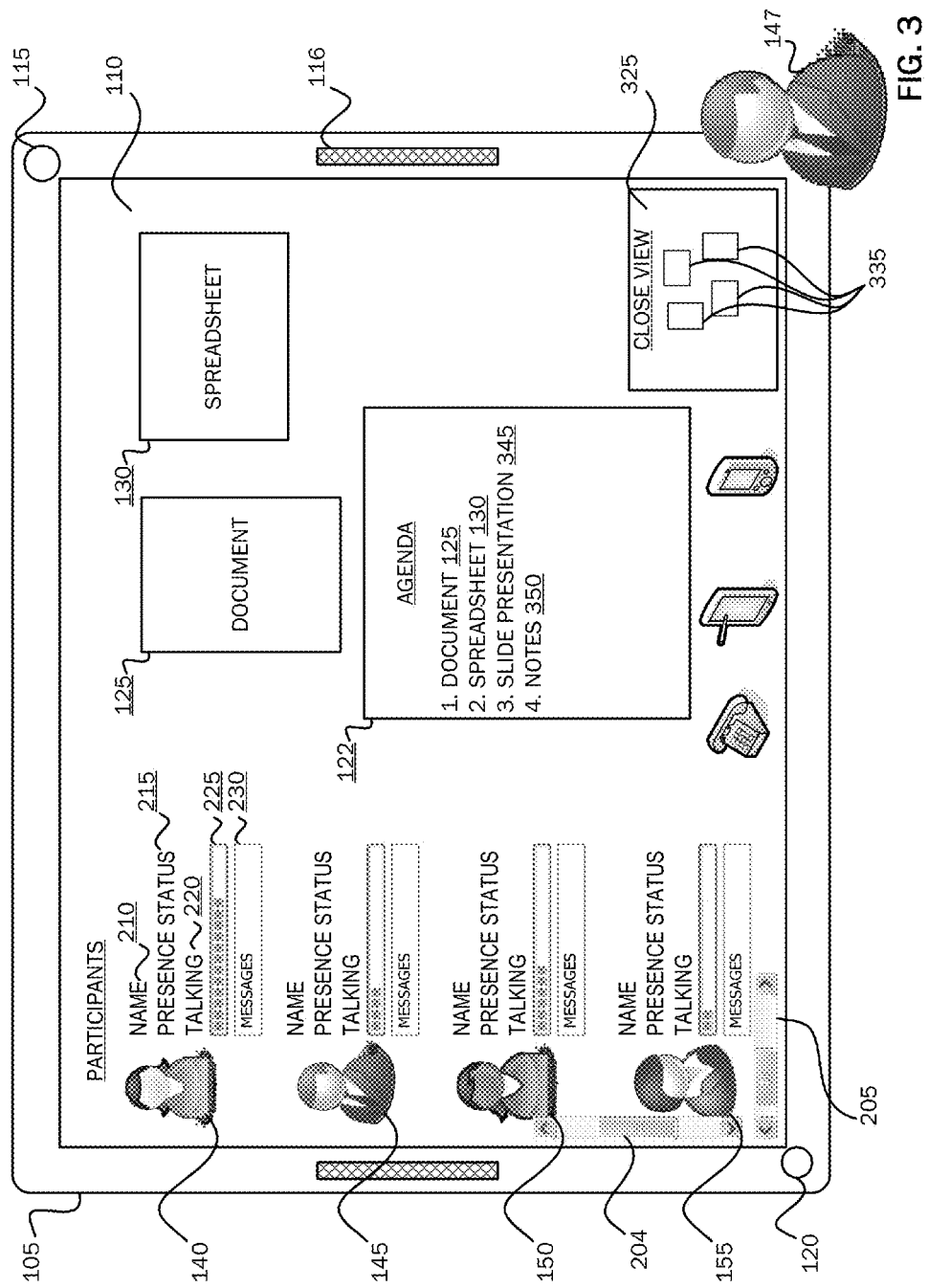
FIG. 3 is a simplified block diagram of a computer-generated display screen showing user and content collaboration in a collaborative work session.

Referring now to FIG. 3, during a given collaborative work session, a variety of content items may be displayed to participants of the collaborative work session for review, editing or otherwise manipulating the displayed content. Displayed content may be displayed through the application 166 through the network 160 from any of the associated computing devices operated by any of the participating users, or the content may be retrieved from the session or meeting file store 167 where it was previously stored before, during or after a previous collaborative work session. As illustrated in FIG. 3, an agenda document 122 displayed on the display surface 110 containing a variety of agenda items for the collaborative work session, a document 125, for example, a word processing document is displayed, and a spreadsheet document 130 is displayed on the display space 110.

In addition to the types of content items illustrated in FIGS. 2-5, calendaring and tasks information may be displayed for the collaborative work session and for individual participants in a given work session. For example, calendaring information for each participant may be displayed in proximity to other information displayed for each participant which may be useful to allow participants to track their own calendars during a work session as well as the calendars of other participants. In addition, task lists for the collaborative work session and/or for individual participants may be displayed. According to one embodiment, tasks in a tasks list for the collaborative work session may be mapped to individual participants such that next steps in the activities of the collaborative work session may be captured and displayed for all participants to review.

According to embodiments, applications responsible for providing such content items (e.g., calendaring applications, notes applications, word processing applications, spreadsheet applications, etc.) may be are optimized for providing content in association with a large display 110 to allow for a variety of input means such as touch and gestures at varying distances form the display 110. In addition, interactions with content items displayed for the work session (as illustrated in FIG. 3) may be accomplished via associated other devices, such as the telephone 170, mobile telephone 175, wired or wireless computer 180, and the like. Thus, a user experience may include interaction with one or more displayed content items via a variety of interaction and input means.

As illustrated in the lower right hand corner of the display space 110, a close view interface component 325 is illustrated. According to embodiments of the present invention, the close view user interface 325 is a user interface component in which content and selectable controls may be displayed for use by a participant who is physically located near the display surface 110, for example, a participant who is presently presenting one or more presentations to other participants. For example, the close view user interface 325 may be a display of the desktop of the presenting participant 147's laptop computer that is operatively connected to the collaborative work session. Similarly, the close view user interface 325 may be a display of documents presently stored for the collaborative work session at the meeting/session file store 167. In addition, selectable functionality controls 335, for example, icons associated with one or more software applications, for example, word processing applications, spreadsheet applications, slide presentation applications, and the like may be presented in the close view user interface 325.

For example, a given participant 147 may be standing a short distance, for example, two feet, from a wall type display unit 105 on which is displayed participant information and content being viewed by each of the participants of a given work session. The close view user interface 325 may provide a display of the presenting participant 147's laptop computer on which he/she has stored one or more documents or other content items he/she desires to present to each of the other participants in the collaborative work session. If the user selects an application functionality or content item from the close view user interface 325, the corresponding application functionality or content item may be displayed on the designated central display unit 105 and associated display surface 110 and on each display unit associated with each other computing device operated by other participants situated remotely from the central display unit. That is, if the example presenting participant selects a document 125 from the close view user interface 325 for presentation to the other participants, the document 125 may be presented as illustrated in FIG. 1 on the display devices of each of the other participants in the collaborative work session.

As should be appreciated, if the information contained in the close view user interface 325 is specific to a particular presenting participant as opposed to being a display of information from a meeting/session file store 167 for the work session, then when a subsequent presenting participant comes to the display area, the subsequent presenting participant may quickly display his/her desired presentation information in the close view user interface component 325 for presentation to the other participants, as described above. As should be appreciated, any suitable input means may be utilized for selecting information from the close view user interface 325, for example, touching the display surface of the close view user interface 325, dragging information from the close view user interface 325 to the display surface 110, keyboard entry, mouse entry, voice command, gesture command, and the like.

Figure 4:
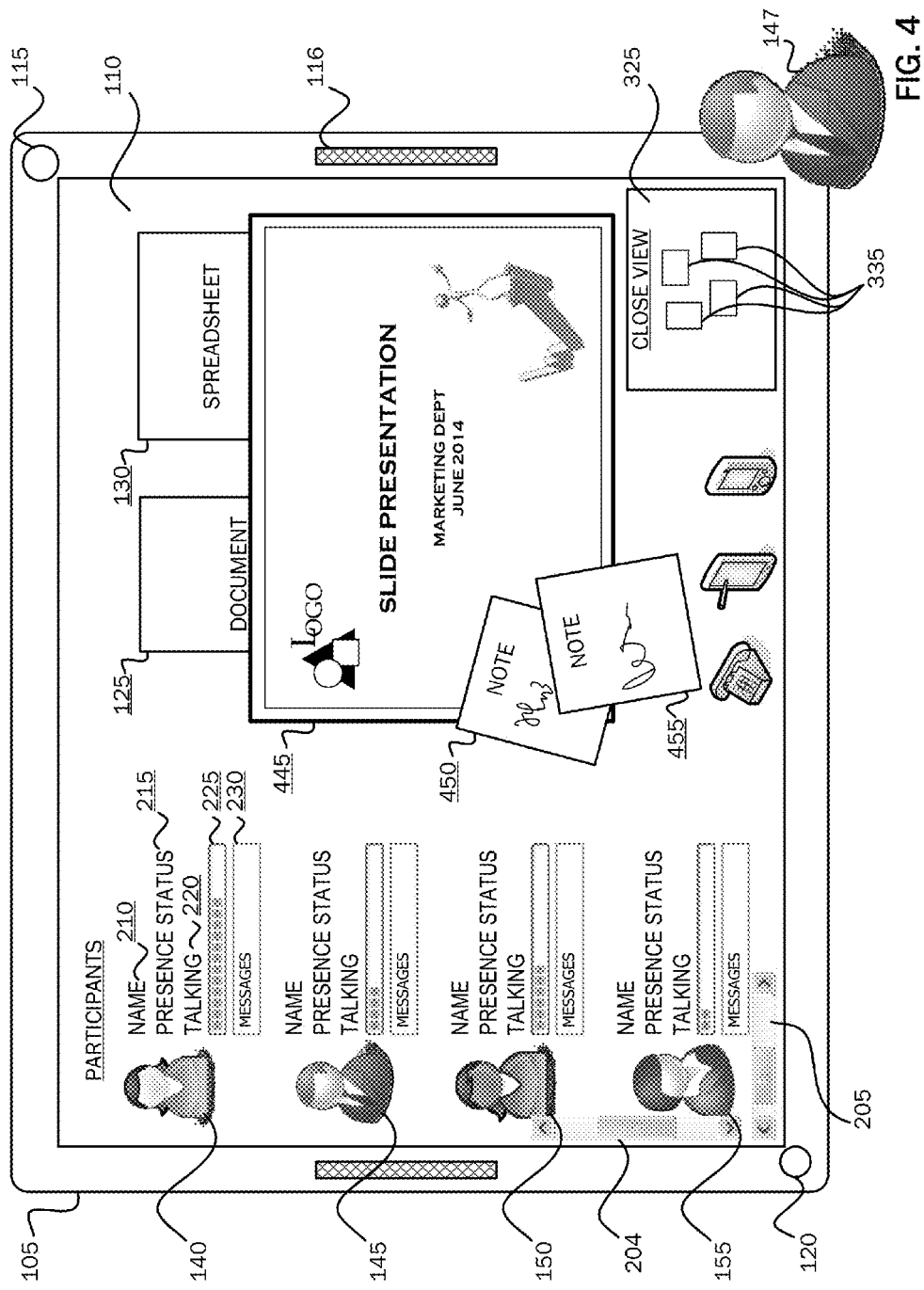
FIG. 4 is a simplified block diagram of a computer-generated display screen showing user and content collaboration in a collaborative work session.

Referring now to FIG. 4, a variety of content items is illustrated on the designated central computing unit 105 and display surface 110. The content may be displayed on the display surface 110 according to a structure desired by participants, or the content may be dragged onto the display surface 110 in a cluttered non-uniform manner to allow a free flowing interaction between the participants, as illustrated in FIG. 4. For example, one or more content items may be associated with a given agenda item and may be displayed while that agenda item is being processed. Another one or more content items may be associated with another agenda item and may be assembled off to one side or corner of the display surface 110 waiting until the associated agenda item is reached. As described above, a participant operating remotely from the designated central display unit may drag and drop content onto his/her display and cause a display of the dragged and dropped content onto the displays of each of the participants. Likewise, each participant may enter, edit, or otherwise manipulate data contained in any of the displayed content for the benefit of each participant in the collaborative work session.

According to one embodiment, electronic pen/ink edits may be done on each display surface capable of receiving electronic pen/ink input. For example, an electronic pen stylus, or a finger of a participant may be used to write, draw, sketch, or otherwise annotate in association with or onto content items displayed for the work session. Importantly, edits to displayed content, regardless of input means, may be saved with the displayed content for subsequent use by present or future participants in a collaborative work session in association with the content being edited during the present collaborative work session.

According to one embodiment, application functionality utilized by the collaborative workspace application 166 may allow for free form electronic pen/ink style input to be associated with various document content types. For example, a user may utilize an electronic pen stylus or his/her finger to sketch a spreadsheet table onto the display surface 110 containing various rows, columns, and resulting cells. The user subsequently may sketch numeric data into one or more cells for completing the sketched table. According to embodiments, the collaborative workspace application 166 in concert with spreadsheet application functionality, for example, Excel® manufactured by Microsoft Corporation, may transfer numeric data entered into the hand-drawn table into a corresponding spreadsheet table that may be maintained by an electronic spreadsheet application, for example, the aforementioned Excel® spreadsheet application. Likewise, handwritten text (e.g., notes 450, 455), or captured voice or speech-to-text input may be translated to corresponding text information that may be saved in a corresponding word processing application, for example, Word® manufactured by Microsoft Corporation. Thus, information input into the collaborative work session by various input means may be integrated with various content items, for example, word processing documents 125, spreadsheet application documents 130, slide presentation application documents 445, notes applications documents 450, 455, and the like.

According to embodiments, the collaborative workspace application 166 as a standalone application or in concert with application functionality of other suitable applications (e.g., word processing applications, spreadsheet applications, slide presentation applications, notes applications, and the like) may optimize the display of content items on the central computing device and display 105, 110. According to one embodiment, content items may be "shredded" and various pieces of content items may be extracted from content items for display. For example, a document displayed on the display 110 may include an embedded chart. The workspace application or another associated application may be operative to pull the example embedded chart from the displayed document for displaying the embedded chart in a larger size on the display 110. For example, a hand gesture by a participant or a drag/drop action from a participant may be used to extract the example embedded chart from the displayed document and for moving the extracted chart to another display position for review by participants.

Such shredding of a document may also allow for optimized processing of components of documents by the workspace application 166. For example, once a given object, such as the example chart, is extracted from the associated document, the workspace application 166 or another application called by the workspace application 166 may operate on the extracted example chart without needing to consume and manipulate other content (e.g., word processing content, photographic content, and the like) form the document from which the chart is extracted.

At the conclusion of a given collaborative work session, information entered, displayed, edited, or otherwise manipulated may be saved for the collaborative work session so that participants of the collaborative work session or future participants in a collaborative work session about the same or similar content may review the content. Likewise, spoken communications occurring during a collaborative work session may be recorded, and an audio recording or text-based transcript of the audio recording may be stored with the content of the collaborative work session so that present participants or future participants in a collaborative work session regarding the same or similar information as the present work session may in effect "play back" the collaborative work session as desired.

Figure 5:
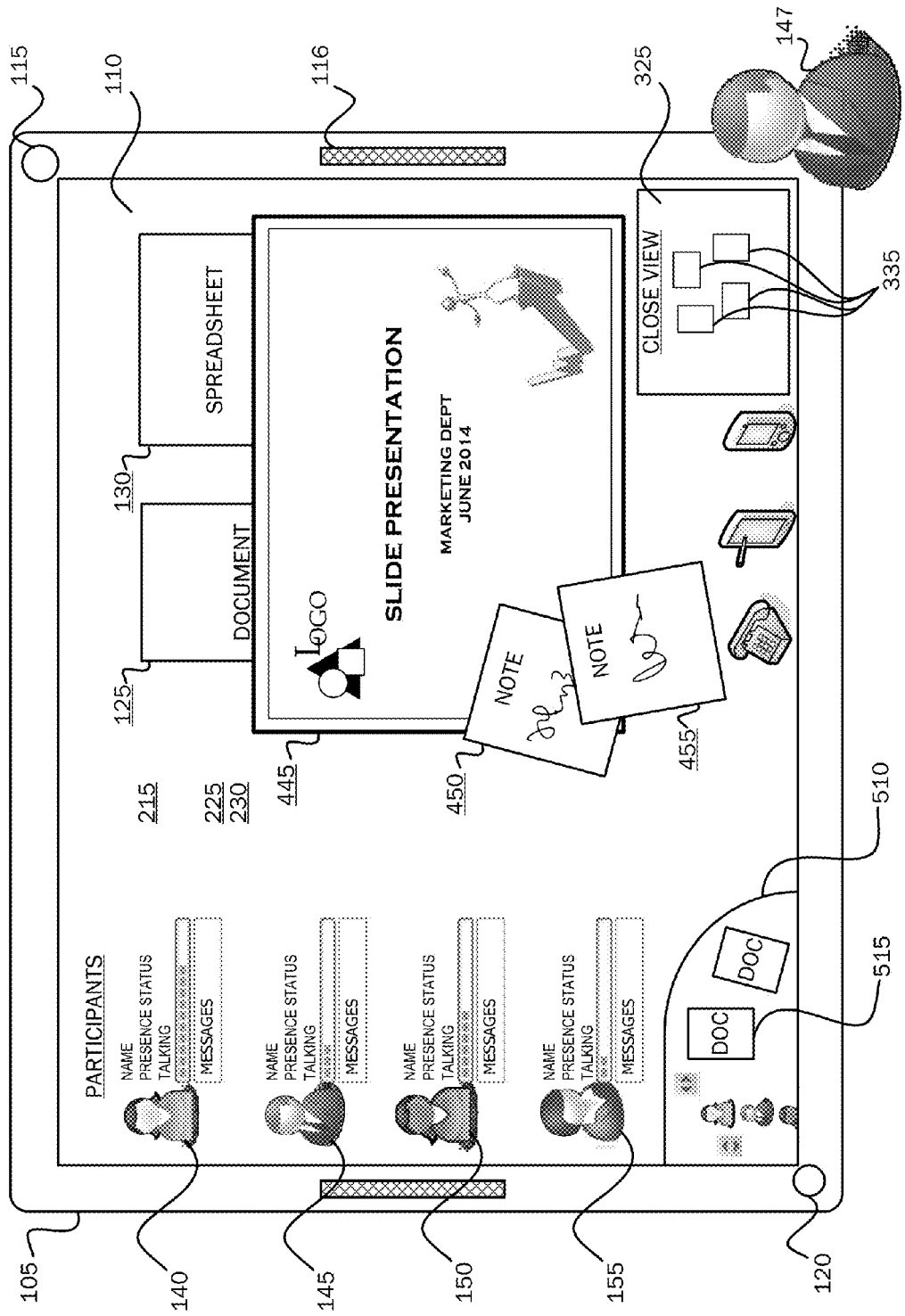
FIG. 5 is a simplified block diagram of a computer-generated display screen showing user and content collaboration in a collaborative work session.

Referring to FIGS. 4 and 5, navigation of information displayed in any suitable display surface or display screen associated with the collaborative work session may be performed according to a variety of suitable means. For example, referring to the lower left corner of FIG. 4, a pair of navigation bars 204, 205 are illustrated for allowing the display space 110 to be scrolled upward and downward or to the right or to the left, as desired. In effect, the display space 110 may take the form of an infinite white board that may be scrolled in any direction to allow room for additional content input or to review content input previously entered that is no longer in the visible display area. As should be appreciated, the display of information for each of the participants may be maintained at all times in the visible display area regardless of the movement of other content in an up, down, right or left orientation so that participants may always see information for other participants even while content that is displayed is being moved relative to movement of the display area.

Referring to FIG. 5, an alternate navigation means is illustrated. A navigation pane 510 is illustrated in the lower left corner of the display surface 110. Inside the navigation pane 510 is a representation 515 of content presently displayed in the display surface 110. According to embodiments, a presenter or other participant may navigate through content displayed on the display space 110 by touch input in the navigation pane 510. For example, a participant, using his/her finger, may touch the display space contained in the navigation pane 510, and by dragging upward or downward or to the right or to the left, may cause navigation movement through the content displayed in the display space 110. As should be appreciated, the navigation mechanisms described above are in addition to other conventional navigation means, for example, keyboard entry and mouse entry, as well as other navigation means, for example, voice navigation command, gesture navigation command and the like. For example, a voice command of "scroll up" or "scroll down" may be used for scrolling the display space 110. Likewise, gesture commands, for example, waving a participant's hand up for scrolling up or waving a participant's hand down for scrolling down, or waving a participant's hand right for scrolling right, or waving a participant's hand left for scrolling left may be utilized for navigating content contained in the display surface 110.

Alternatively, the content items illustrated in the navigation pane 510 may be illustrative of content items that are available for display on the display 110, but that are not presently displayed. Interaction with the content items illustrated in the navigation pane 510 by a participant (e.g., by touch, gesture, voice command, etc.) may be used for causing a display of desired content items on the central display 110 and on displays of associated computing devices 170, 175, 180.

Figure 6:
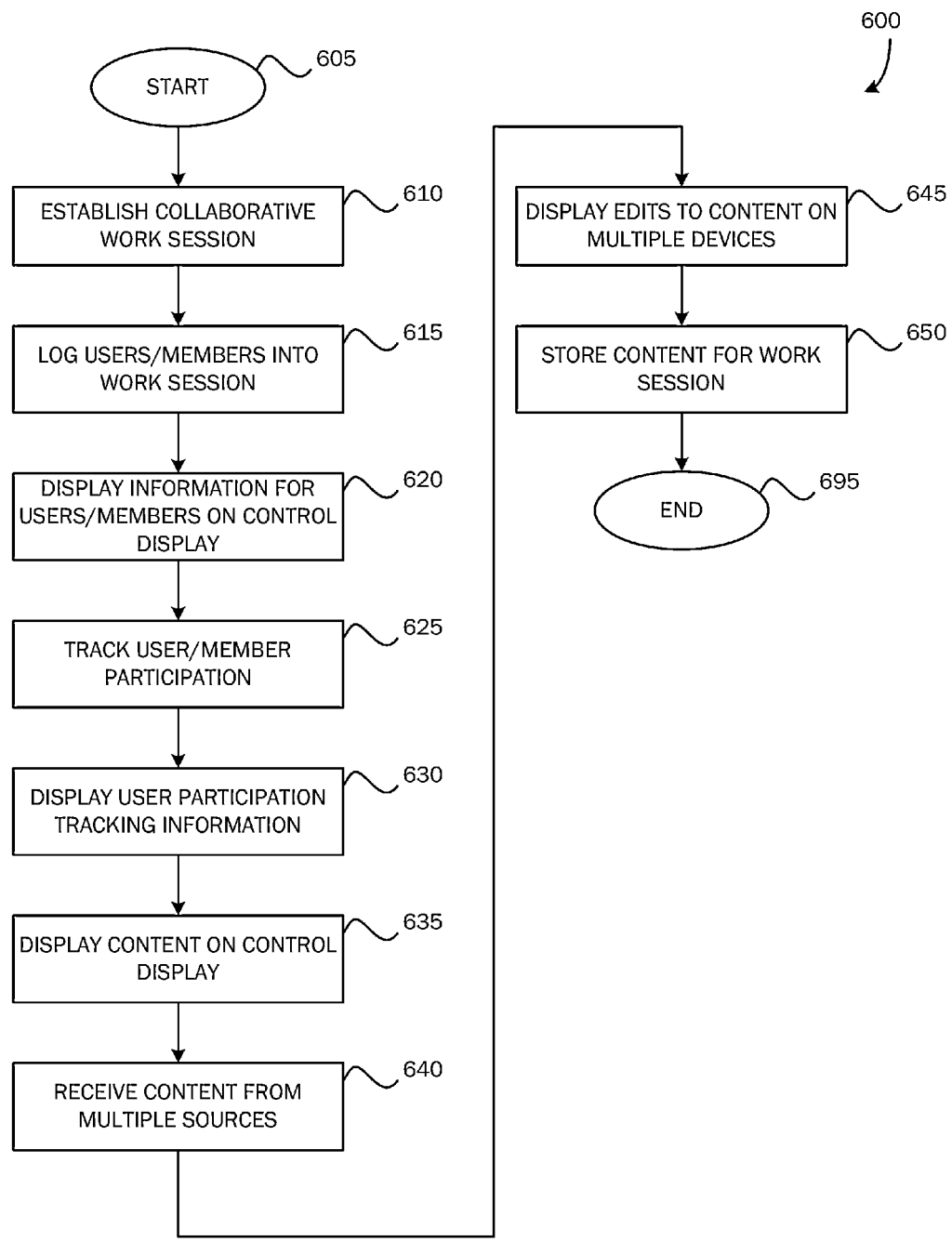
FIG. 6 is a flow chart illustrating a method for establishing and conducting a collaborative work session according to embodiments of the present invention.

Having described a system and operating architecture for a multi-user, multi-computing device collaborative work experience, FIG. 6 is a flow chart illustrating a method for establishing and conducting a collaborative work session according to embodiments of the present invention. The routine 600 begins at start operation 605 and proceeds to operation 610 where a collaborative work session is established. For example, if a new collaborative workspace and associated collaborative work session is to be established, a file store at the file store 167 may be set up for receiving content before, during or after the collaborative work session. Any computing devices, for example, remote servers 165, meeting store locations 167, other computing devices, projection devices, display devices, and the like may be identified. Next, a display device, for example, the display unit 105 illustrated above may be designated as a central display unit and surface 110 for displaying information during the collaborative work session.

At operation 615, any participants wishing to join the collaborative work session who have appropriate permissions to join the work session may log into the collaborative work session, as described above with reference to FIG. 2. At operation 620, information for participants who have logged into the collaborative work session may be displayed, as illustrated and described above. As should be appreciated, information for participants who are not presently logged into the collaborative work session may also be displayed for the benefit of other participants, where those participants have previously been part of the collaborative work session, but who are not involved in the present collaborative work session. Alternatively, identification of and information for any participant associated with a given workspace for which the work session is being conducted may be associated with and displayed at operation 620.

At operation 625, activities of logged in or associated participants may be tracked, for example, tracking presence status, tracking talking status, tracking a percentage of talking, and the like, as described above. At operation 630, participant tracking information may be displayed for the benefit of other participants of the collaborative work session.

At operation 635, any content distributed by any participant of the collaborative work session, for example, content distributed by a presenting participant via the close view user interface 325 may be displayed on a display surface of any computing device associated with the work session, for example, on a designated central computing surface. Such content then may be distributed out to other display devices associated with computing devices in use by remotely situated participants. At operation 640, additional content may be received from multiple sources associated with various other participants in the collaborative work session.

At operation 645, any edits to content received form one or more computing devices associated from one or more participants in the collaborative work session may be received and may be displayed on each associated display device including the designated central computing surface. At operation 650, content received, edited, or otherwise manipulated including recordings and/or transcripts of participant communications may be stored for the collaborative work session at the meeting/session file store 167. The routine ends at operation 695.

The embodiments and functionalities described herein may operate via a multitude of computing systems, including wired and wireless computing systems, mobile computing systems (e.g., mobile telephones, tablet or slate type computers, laptop computers, wall-type computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 7-9 and the associated descriptions provide a discussion of a variety of operating environments in which embodiments of the invention may be practiced. However, the devices and systems illustrated and discussed with respect to FIGS. 7-9 are for purposes of example and illustration and are not limiting of a vast number of computing device configurations that may be utilized for practicing embodiments of the invention, described herein.

Figure 7A:
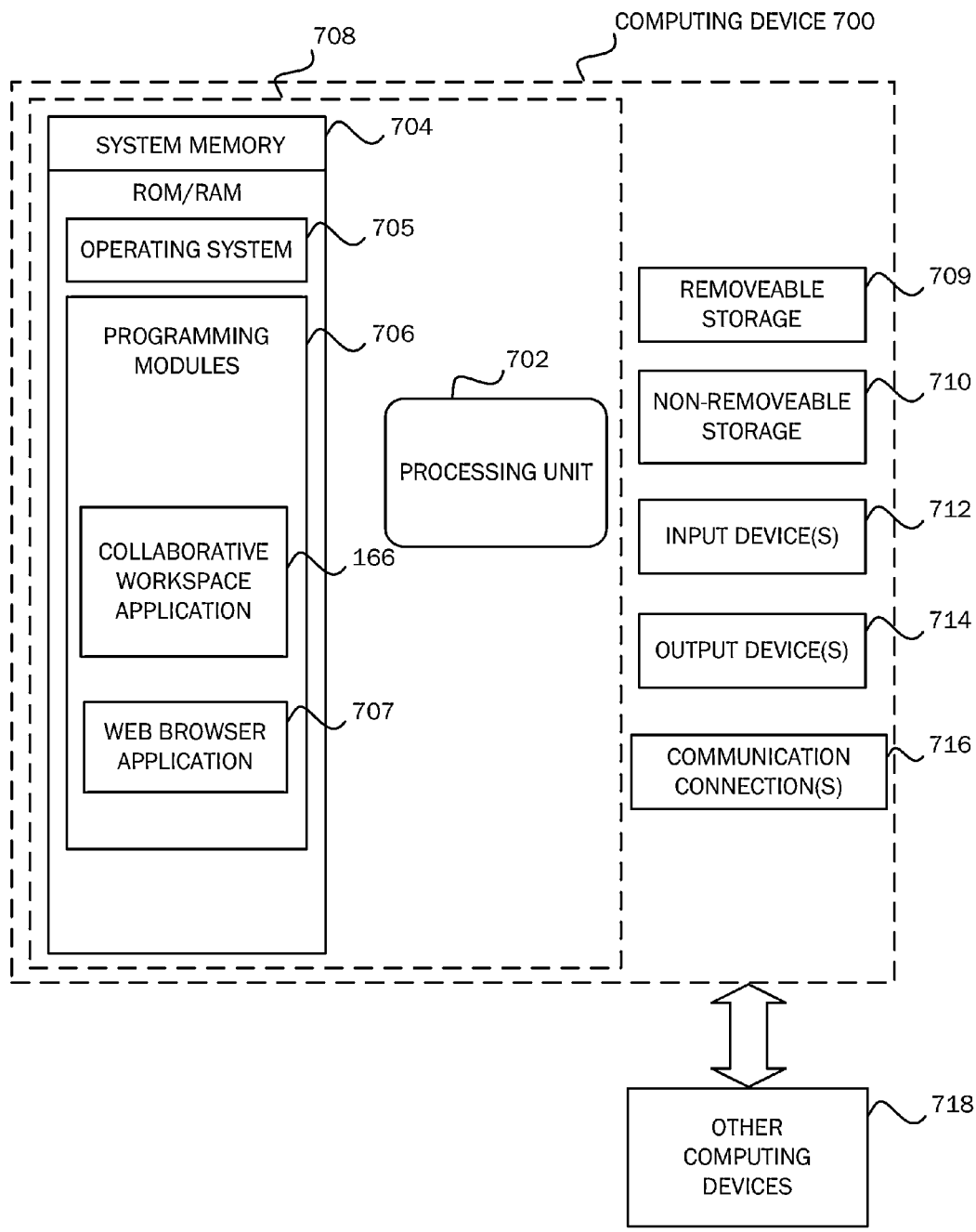
FIG. 7A is a simplified block diagram of a computing device with which embodiments of the present invention may be practiced.

FIG. 7A is a block diagram illustrating example physical components of a computing device 700 with which embodiments of the invention may be practiced. The computing device components described below may be suitable for the computing devices described above, for example, the computing devices 105, 175, 180 and the server and data systems 165 and 167. In a basic configuration, computing device 700 may include at least one processing unit 702 and a system memory 704. Depending on the configuration and type of computing device, system memory 704 may comprise, but is not limited to, volatile (e.g. random access memory (RAM)), non-volatile (e.g. read-only memory (ROM)), flash memory, or any combination. System memory 704 may include operating system 705, one or more programming modules 706, and may include a web browser application 707. Operating system 705, for example, may be suitable for controlling computing device 700's operation. Furthermore, embodiments of the invention may be practiced in conjunction with a graphics library, other operating systems, or any other application program and is not limited to any particular application or system. This basic configuration is illustrated in FIG. 7A by those components within a dashed line 708.

Computing device 700 may have additional features or functionality. For example, computing device 700 may also include additional data storage devices (removable and/or non-removable) such as, for example, magnetic disks, optical disks, or tape. Such additional storage is illustrated in FIG. 7A by a removable storage 709 and a non-removable storage 710.

As stated above, a number of program modules and data files may be stored in system memory 704, including operating system 705. While executing on processing unit 702, programming modules 706, such as the collaborative workspace application 166 may perform processes including, for example, one or more method 600's stages as described above. The aforementioned process is an example, and processing unit 702 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations 718, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network via one or more communications connections 716. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 7A may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the collaborative workspace application 166 may operated via application-specific logic integrated with other components of the computing device/system 700 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 704, removable storage 709, and non-removable storage 710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 700. Any such computer storage media may be part of device 700. Computing device 700 may also have input device(s) 712 such as a keyboard, a mouse, a pen, a sound input device, a touch input device, etc. Output device(s) 714 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7B:
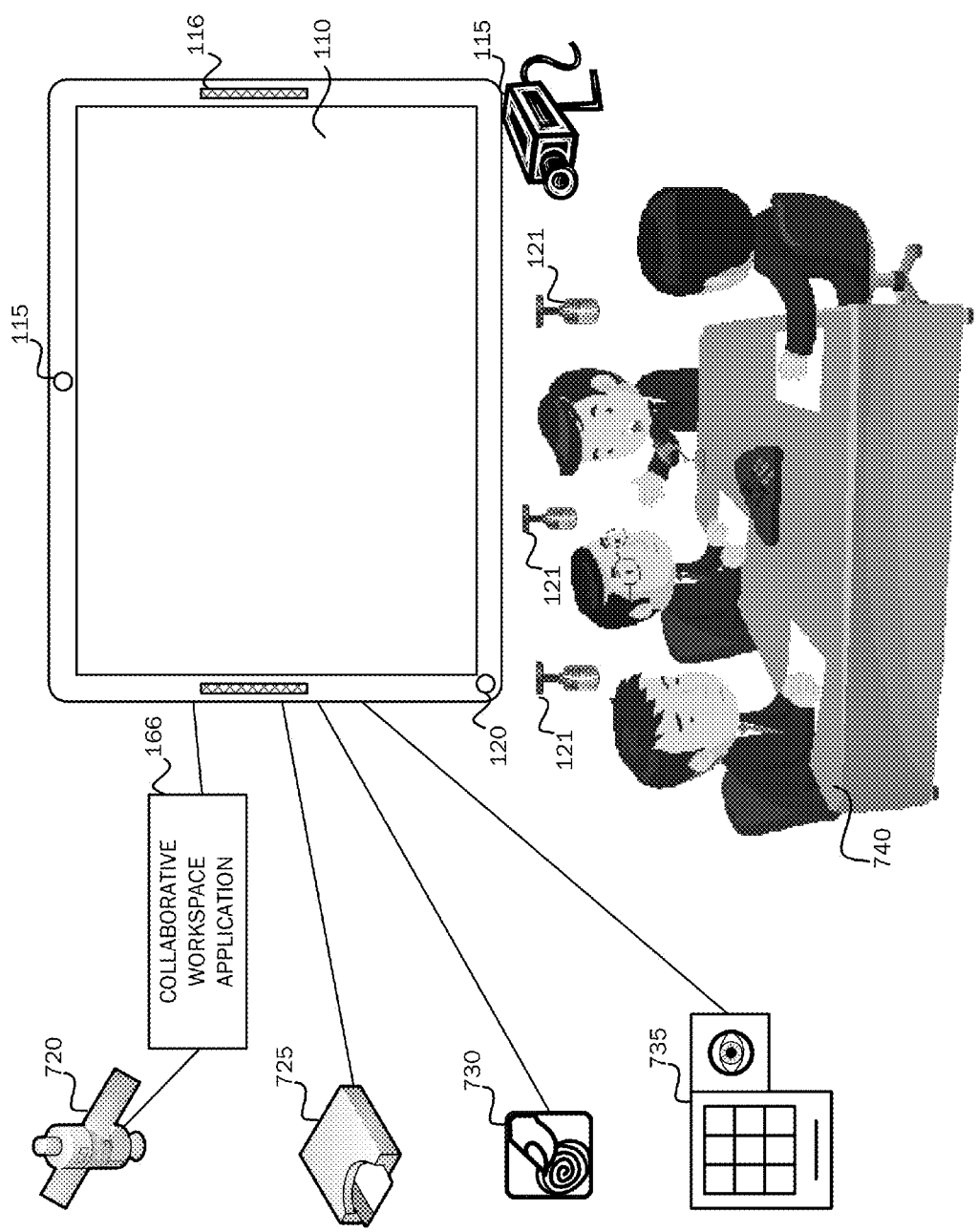
FIG. 7B is a simplified block diagram of a wall-type computing device and associated systems for interacting with the wall-type computing device with which embodiments of the present invention may be practiced.

FIG. 7B is a simplified block diagram of a wall-type computing device and associated systems for interacting with the wall-type computing device. As described above with reference to FIG. 1, a computing device 105 and associated display 110 may serve as an operating environment for embodiments of the present invention. According to one embodiment, the device 105 may be in the form of a combination computer/display or the device 105 may include a display onto which information and content are projected from a forward or rearward projector. According to embodiments, a given work session may be conducted by integration of a variety of computing devices as illustrated in FIG. 1, or a given work session may be conducted entirely with the use of the wall-type computing device 105 illustrated in FIG. 7B where all information displayed on the display 110 is associated with one or more participants located in the area of the device 105.

The device 105 may be associated with a variety of ancillary devices/systems for allowing interaction with the device and associated display. Referring to FIG. 7B, an on-board camera 115 may be operative to allow videoconferencing with other computing devices 170, 175 and 180. A remote camera 116 may likewise provide such functionality. The cameras 115, 116 may also be operative for detecting gestures from participants for interacting with the application 166 and the device 105 as described above.

An on-board microphone 120 and an array of remote microphones 121 may be operative to receive audio input from participants 740 for audio and/or video conferencing (including teleconferencing between/among participants in proximity of the device 105 and remote participants) and for providing voice commands to the application 166 for interacting with the application 166 and the device 105. According to one embodiment, the array of microphones may also be used for directing the cameras 115, 116 in the direction of audio input, for example, a speaking participant.

As described above, a variety of means may be employed for allowing a participant to register or log into a given work session. Referring still to FIG. 7B, a smart card reader 725 is illustrative of a device for reading an identification card either through physical contact between a card and the reader 725 (e.g., card swipe) or through signaling from the card to the reader (e.g., RFID signaling). A fingerprint scanner 730 is illustrative of a device for allowing a logging in participant to join a session via a scan of a finger, thumb, hand, or facial image. A retinal scanner 735 is illustrative of a scanner for identifying a participant based on a scan of the participant's eye.

In addition, as described above, location information for a given participant may be obtained via a variety of location means, and such location information may be used for both joining a participant into a work session and for providing information about the participant to other participants. A global positioning satellite system 720 is illustrative of a number of location determining means for providing location information for a given participant to the application 166. Location and/or presence information for a given participant may likewise be determined by other means as described above.

Figure 8A:
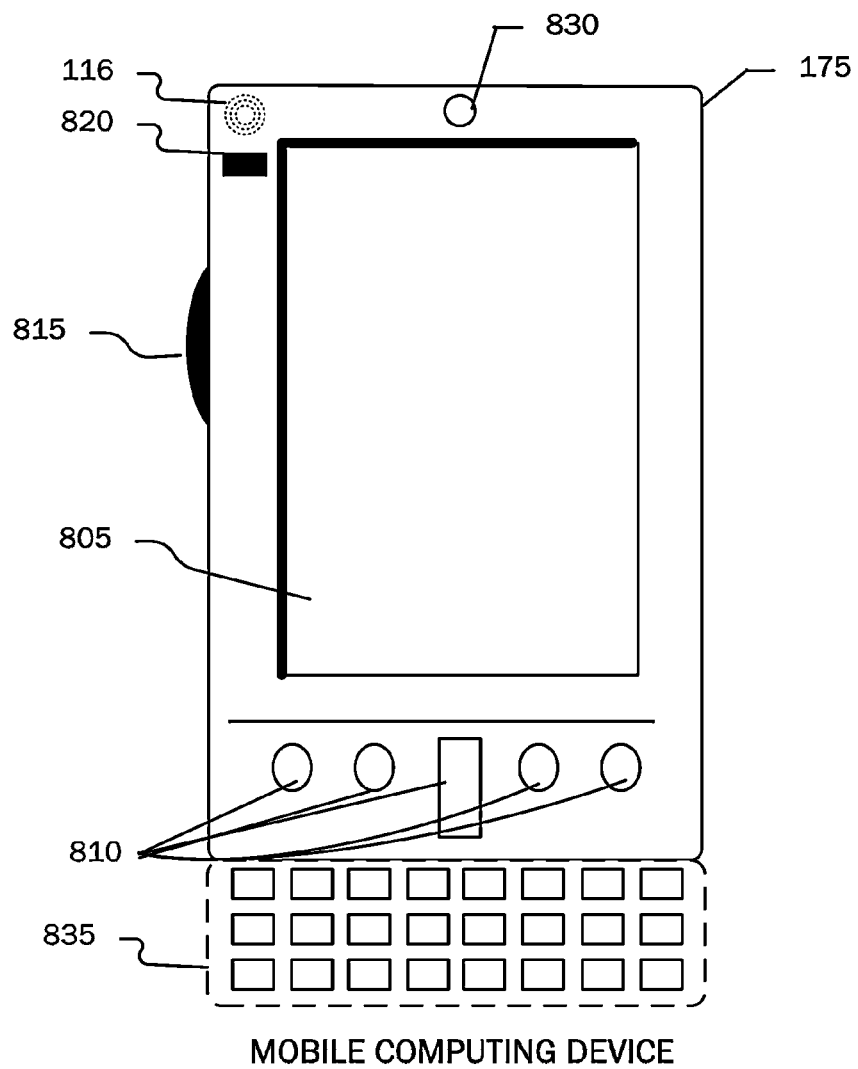
FIGS. 8A and 8B are simplified block diagrams of a mobile computing device with which embodiments of the present invention may be practiced.
Figure 8B:
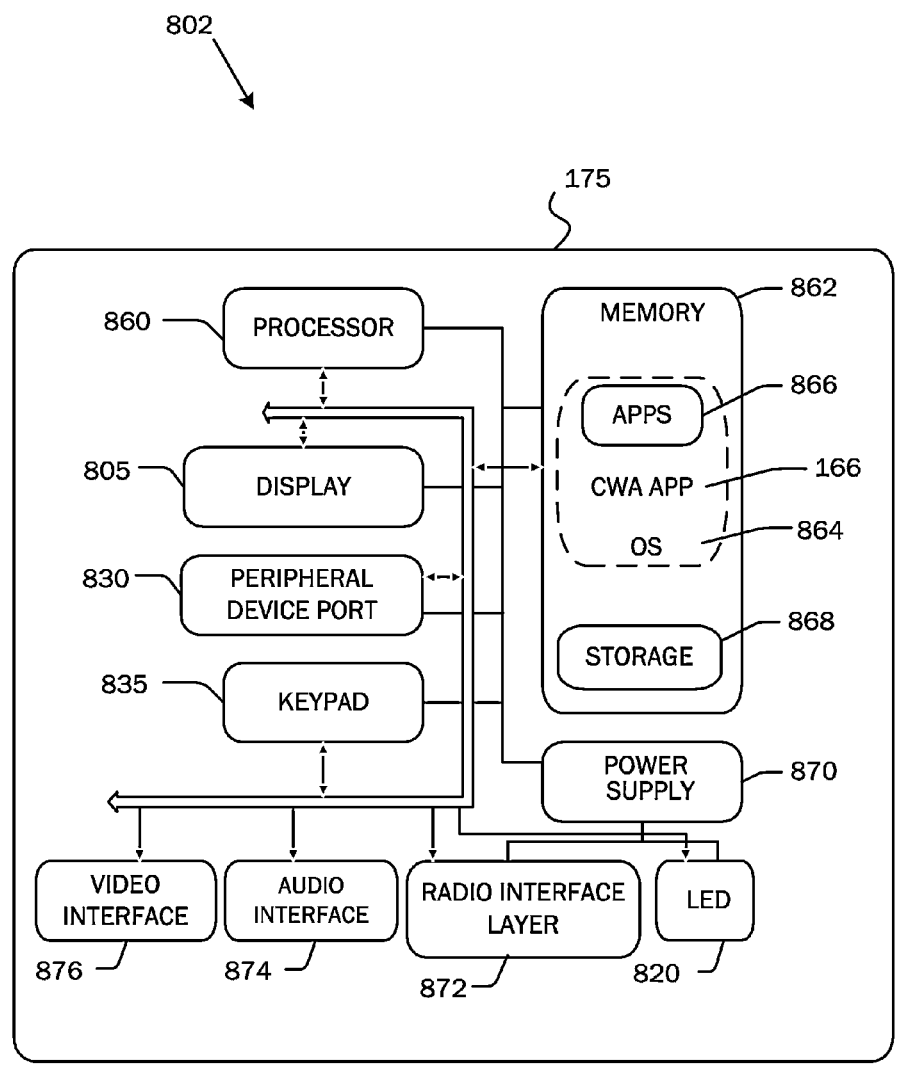
Figure 9:
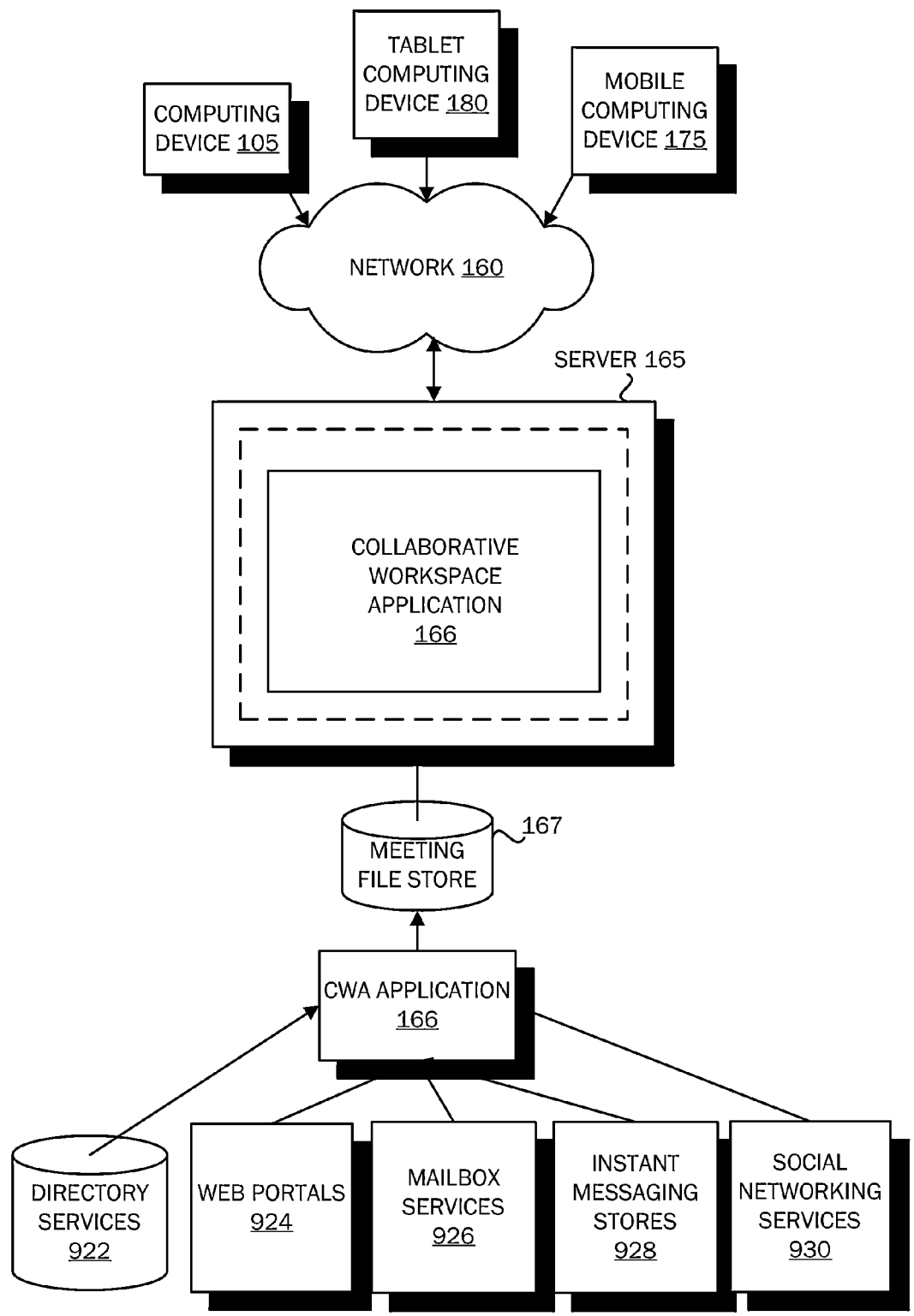
FIG. 9 is a simplified block diagram of a distributed computing system in which embodiments of the present invention may be practiced.

FIGS. 8A and 8B illustrate a suitable mobile computing environment, for example, a mobile telephone 175, a smartphone, a tablet personal computer, a laptop computer, and the like, with which embodiments of the invention may be practiced. With reference to FIG. 8A, an example mobile computing device 175 for implementing the embodiments is illustrated. In a basic configuration, mobile computing device 175 is a handheld computer having both input elements and output elements. Input elements may include touch screen display 805 and input buttons 815 that allow the user to enter information into mobile computing device 175. Mobile computing device 175 may also incorporate an optional side input element 815 allowing further user input. Optional side input element 810 may be a rotary switch, a button, or any other type of manual input element. In alternative embodiments, mobile computing device 175 may incorporate more or less input elements. For example, display 805 may not be a touch screen in some embodiments. In yet another alternative embodiment, the mobile computing device is a portable phone system, such as a cellular phone having display 805 and input buttons 815. Mobile computing device 175 may also include an optional keypad 835. Optional keypad 815 may be a physical keypad or a "soft" keypad generated on the touch screen display.

Mobile computing device 175 incorporates output elements, such as display 805, which can display a graphical user interface (GUI). Other output elements include speaker 825 and LED light 820. Additionally, mobile computing device 175 may incorporate a vibration module (not shown), which causes mobile computing device 175 to vibrate to notify the user of an event. In yet another embodiment, mobile computing device 175 may incorporate a headphone jack (not shown) for providing another means of providing output signals.

Although described herein in combination with mobile computing device 175, in alternative embodiments the invention is used in combination with any number of computer systems, such as in desktop environments, laptop or notebook computer systems, multiprocessor systems, micro-processor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 8B is a block diagram illustrating components of a mobile computing device used in one embodiment, such as the computing device shown in FIG. 8A. That is, mobile computing device 175 can incorporate system 802 to implement some embodiments. For example, system 802 can be used in implementing a "smart phone" that can run one or more applications similar to those of a desktop or notebook computer such as, for example, browser, e-mail, scheduling, instant messaging, and media player applications. In some embodiments, system 802 is integrated as a computing device, such as an integrated personal digital assistant (PDA) and wireless phone.

One or more application programs 866 may be loaded into memory 862 and run on or in association with operating system 864. Examples of application programs include phone dialer programs, e-mail programs, PIM (personal information management) programs, word processing programs, spreadsheet programs, Internet browser programs, messaging programs, and so forth. System 802 also includes non-volatile storage 868 within memory 862. Non-volatile storage 868 may be used to store persistent information that should not be lost if system 802 is powered down. Applications 866 may use and store information in non-volatile storage 868, such as e-mail or other messages used by an e-mail application, and the like. A synchronization application (not shown) also resides on system 802 and is programmed to interact with a corresponding synchronization application resident on a host computer to keep the information stored in non-volatile storage 868 synchronized with corresponding information stored at the host computer. As should be appreciated, other applications may be loaded into memory 862 and run on the device 175 a collaborative workspace application (CWA) 166, described herein.

System 802 has a power supply 870, which may be implemented as one or more batteries. Power supply 870 might further include an external power source, such as an AC adapter or a powered docking cradle that supplements or recharges the batteries.

System 802 may also include a radio 872 that performs the function of transmitting and receiving radio frequency communications. Radio 872 facilitates wireless connectivity between system 802 and the "outside world", via a communications carrier or service provider. Transmissions to and from radio 872 are conducted under control of OS 864. In other words, communications received by radio 872 may be disseminated to application programs 866 via OS 864, and vice versa.

Radio 872 allows system 802 to communicate with other computing devices, such as over a network. Radio 872 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 802 is shown with two types of notification output devices; LED 820 that can be used to provide visual notifications and an audio interface 874 that can be used with speaker 825 to provide audio notifications. These devices may be directly coupled to power supply 870 so that when activated, they remain on for a duration dictated by the notification mechanism even though processor 860 and other components might shut down for conserving battery power. LED 820 may be programmed to remain on indefinitely until the user takes action to indicate the powered-on status of the device. Audio interface 874 is used to provide audible signals to and receive audible signals from the user. For example, in addition to being coupled to speaker 825, audio interface 874 may also be coupled to a microphone 820 to receive audible input, such as to facilitate a telephone conversation. In accordance with embodiments of the present invention, the microphone 820 may also serve as an audio sensor to facilitate control of notifications, as will be described below. System 802 may further include video interface 876 that enables an operation of on-board camera 830 to record still images, video stream, and the like.

A mobile computing device implementing system 802 may have additional features or functionality. For example, the device may also include additional data storage devices (removable and/or non-removable) such as, magnetic disks, optical disks, or tape. Such additional storage is illustrated in FIG. 8B by storage 868. Computer storage media may include volatile and nonvolatile, removable and non-removable media implemented in any method or technology for storage of information, such as computer readable instructions, data structures, program modules, or other data.

Data/information generated or captured by the device 175 and stored via the system 802 may be stored locally on the device 175, as described above, or the data may be stored on any number of storage media that may be accessed by the device via the radio 872 or via a wired connection between the device 175 and a separate computing device 405 associated with the device 175, for example, a server computer in a distributed computing network 415 such as the Internet. As should be appreciated such data/information may be accessed via the device 175 via the radio 872 or via a distributed computing network 415. Similarly, such data/information may be readily transferred between computing devices for storage and use according to well-known data/information transfer and storage means, including electronic mail and collaborative data/information sharing systems.

FIG. 9 illustrates a system architecture for providing communications and content associated with a collaborative work session to various client devices via a distributed computing environment before during or after a work session, as described above. As described previously, a collaborative workspace application 166 allows for multi-user and multi-device collaboration. Communications and content conducted and developed or edited in association with a collaborative work session may also be stored in different communication channels or other storage types. For example, work session communications and content along with information from which they are developed may be stored using directory services 922, web portals 924, mailbox services 926, instant messaging stores 928 and social networking sites 930. The systems/applications 166 may use any of these types of systems or the like for enabling collaborative work session communications and content for storing same in a store 167. A server 165 may provide collaborative work session communications and content to clients. As one example, server 165 may be a web server providing collaborative work session communications and content over the web. Server 165 may provide online collaborative work session communications and content over the web to clients through a network 160. Examples of clients that may obtain collaborative work session communications and content include computing device 105, which may include any general purpose personal computer, a tablet computing device 180 and/or mobile computing device 175 which may include smart phones. Any of these devices may obtain collaborative work session communications and content from the store 167.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:
1. A method for providing a collaborative work session, comprising:
 associating a plurality of work session participants with the collaborative work session;

displaying on a computer-generated display information for identifying each of the plurality of work session participants;

reporting information for each of the plurality of work session participants on the computer-generated display for review by each other of the plurality of work session participants;

tracking participation by each of the plurality of work session participants during the collaborative work session, including determining which of any of the plurality of work session participants is speaking at any given time during the collaborative work session and determining an amount of time each of the plurality of work session participants is speaking as compared to an amount of time other of the plurality of work session participants is speaking during a given duration of the collaborative work session;

reporting information relevant to the collaborative work session on the computer-generated display for review by one or more of the plurality of work session participants, including reporting participation information for each of the plurality of work session participants, including an indication of the amount of time each of the plurality of work session participants is speaking as compared to the amount of time other of the plurality of work session participants is speaking during the given duration of the collaborative work session; and receiving one or more content items from one or more of the plurality of work session participants, and displaying the received one or more content items on the computer-generated display.

2. The method of claim 1, wherein the computer-generated display includes a computer-generated display of a wall-disposed integrated computing device and display.

3. The method of claim 1, wherein reporting information relevant to the collaborative work session on the computer-generated display for review by one or more of the plurality of work session participants includes reporting one or more task items associated with the collaborative work session and mapping one or more of the one or more task items to one or more of the plurality of work session participants.

4. The method of claim 1, wherein reporting information relevant to the collaborative work session on the computer-generated display for review by one or more of the plurality of work session participants includes reporting news information relevant to the collaborative work session.

5. The method of claim 1, further comprising capturing audio and/or video input from one or more of the plurality of work session participants for providing audio and/or video conferencing between one or more of the plurality of work session participants participating in the collaborative work session at a first location and one or more of the plurality of work session participants participating in the collaborative work session at a second location.

6. The method of claim 1, wherein displaying on a computer-generated display information for identifying each of the plurality of work session participants includes displaying an identifying image for each of the plurality of work session participants for distinguishing each of the plurality of work session participants from one another.

7. The method of claim 1, wherein displaying on a computer-generated display information for identifying each of the plurality of work session participants includes displaying presence status information for each of the plurality of work session participants.

8. The method of claim 7, wherein displaying presence status information for each of the plurality of work session participants includes displaying calendar information for each of the plurality of work session participants.

9. The method of claim 1, further comprising receiving one or more communications from one or more of the plurality of work session participants, the one or more communications being directed to the collaborative work session, and displaying the one or more communications on the computer-generated display for review by the plurality of work session participants.

10. The method of claim 9, wherein receiving the one or more communications from one or more of the plurality of work session participants includes receiving a message from one or more of the plurality of work session participants indicating a status of attendance of the one or more of the plurality of work session participants to the collaborative work session.

11. The method of claim 9, wherein receiving the one or more communications from one or more of the plurality of work session participants includes receiving one or more work session content items directed to the collaborative work session, and wherein displaying the one or more communications on the computer-generated display for review by the plurality of work session participants includes displaying the one or more work session content items on the computer-generated display.

12. The method of claim 1, wherein one or more of the plurality of work session participants is situated remotely from one or more other of the plurality of work session participants and wherein the collaborative work session, including any display of any work session information is distributed among any of the collaborative work session participants and is displayed on a computer-generated display associated with each of the remotely situated work session participants.

13. The method of claim 1, prior to associating a plurality of work session participants with the collaborative work session, further comprising logging one or more of the plurality of work session participants into the collaborative work session according to one or more log-in means.

14. The method of claim 13, further comprising limiting a display on the computer-generated display of information, including content items, associated with any work session participant associated with the collaborative work session who is not logged into the collaborative work session.

15. The method of claim 13, wherein logging one or more of the plurality of work session participants into the collaborative work session according to the one or more log-in means includes logging one or more of the plurality of work session participants into the collaborative work session automatically when presence information for the one or more of the plurality of work session participants indicates the one or more of the plurality of work session participants is available for participation in the collaborative work session.

16. The method of claim 13, wherein logging one or more of the plurality of work session participants into the collaborative work session according to the one or more log-in means further comprises providing one or more work session access options to a work session participant logged into the collaborative work session.

17. A computer-readable storage device containing computer-executable instructions which when executed by a computer perform a method for providing a collaborative work session, comprising:

associating a plurality of work session participants with the collaborative work session;

displaying on a computer-generated display information for identifying each of the plurality of work session participants;

displaying on the computer-generated display presence status information for each of the plurality of work session participants;

tracking participation by each of the plurality of work session participants during the collaborative work session, including determining which of any of the plurality of work session participants is speaking at any given time during the collaborative work session and determining an amount of time each of the plurality of work session participants is speaking as compared to an amount of time other of the plurality of work session participants is speaking during a given duration of the collaborative work session;

reporting information for each of the plurality of work session participants on the computer-generated display for review by each other of the plurality of work session participants, including reporting participation information for each of the plurality of work session participants, including an indication of the amount of time each of the plurality of work session participants is speaking as compared to the amount of time other of the plurality of work session participants is speaking during the given duration of the collaborative work session; and receiving one or more content items from one or more of the plurality of work session participants, and displaying the received one or more content items on the computer-generated display.

18. A system for providing a collaborative work session, comprising:

a collaborative work session application operative to:

associate a plurality of work session participants with the collaborative work session;

display on a computer-generated display information for identifying each of the plurality of work session participants;

track participation by each of the plurality of work session participants during the collaborative work session;

determine which of any of the plurality of work session participants is speaking at any given time during the collaborative work session;

determine an amount of time each of the plurality of work session participants is speaking as compared to an amount of time other of the plurality of work session participants is speaking during a given duration of the collaborative work session;

display on the computer-generated display an indication of which of any of the plurality of work session participants is speaking at any given time during the collaborative work session and an indication of the amount of time each of the plurality of work session participants is speaking as compared to the amount of time other of the plurality of work session participants is speaking during the given duration of the collaborative work session; and display one or more content items received from one or more of the plurality of work session participants on the computer-generated display, the one or more content items including one or more of messages or one or more types of data.

19. The system of claim 18, further comprising the collaborative work session application operative to:

display on the computer-generated display an indication of presence status information for each of the plurality of work session participants.

20. The system of claim 19, wherein the indication of presence status information for each of the plurality of work session participants includes displaying calendar information for each of the plurality of work session participants.

* * * * *